(12) United States Patent
Kumai et al.

(10) Patent No.: US 9,384,649 B2
(45) Date of Patent: Jul. 5, 2016

(54) VEHICLE INFORMATION TRANSMITTING APPARATUS

(75) Inventors: Yuichi Kumai, Susono (JP); Shinya Kawamata, Gotenba (JP); Yoshiyuki Hatakeyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 14/233,287

(22) PCT Filed: Jul. 21, 2011

(86) PCT No.: PCT/JP2011/066604
§ 371 (c)(1),
(2), (4) Date: Jan. 16, 2014

(87) PCT Pub. No.: WO2013/011588
PCT Pub. Date: Jan. 24, 2013

(65) Prior Publication Data
US 2014/0132407 A1    May 15, 2014

(51) Int. Cl.
*B60Q 1/00*      (2006.01)
*G08B 21/18*    (2006.01)
*G08G 1/0962*  (2006.01)
*G08G 1/16*      (2006.01)
(Continued)

(52) U.S. Cl.
CPC .............. *G08B 21/18* (2013.01); *B60K 35/00* (2013.01); *G06K 9/00845* (2013.01); *G08G 1/0962* (2013.01); *G08G 1/166* (2013.01); *B60K 2350/1096* (2013.01); *B60K 2350/2052* (2013.01)

(58) Field of Classification Search
CPC ........ G08B 21/18; G08B 21/06; B60K 35/00; B60K 37/06; B60K 2350/1096; B60K 2350/2052; G08G 1/66; G08G 1/0962; G06K 9/00845
USPC .............. 340/435, 436, 438, 439, 425.5, 576; 701/1, 70, 301
See application file for complete search history.

(56) References Cited

U.S. PATENT DOCUMENTS 5,801,667 A * 9/1998 Shimizu ................. H04N 7/183
                                                                340/435
6,556,905 B1 * 4/2003 Mittelsteadt ........... G07C 5/008
                                                                340/439
6,906,619 B2 * 6/2005 Williams ................. B60Q 9/00
                                                                340/425.5
(Continued)

FOREIGN PATENT DOCUMENTS

CN        101934771 A         1/2011
JP        A-05-038991          2/1993
(Continued)

Primary Examiner — Anh V La
(74) Attorney, Agent, or Firm — Oliff PLC

(57) ABSTRACT

A vehicle information transmitting apparatus transmits information to a driver by optical stimulus, and determines whether or not to change a mode of the stimulus on the basis of at least one of information about the driver, an operation input, and a behavior of a vehicle, the information about the driver, the operation input, and the behavior being obtained after the transmission of the information. The vehicle information transmitting apparatus may change the mode of the stimulus when determining that the information is not considered by the driver. Further, the vehicle information transmitting apparatus may change the mode of the stimulus when determining that a cause that the information is not considered resides in the mode of the stimulus.

9 Claims, 18 Drawing Sheets

(51) Int. Cl.
*B60K 35/00* (2006.01)
*G06K 9/00* (2006.01)

(56) References Cited

U.S. PATENT DOCUMENTS

| | | | |
|---|---|---|---|
| 8,179,243 B2 * | 5/2012 | Chen | B60W 30/12 340/425.5 |
| 2008/0204208 A1 * | 8/2008 | Kawamata | B60R 1/00 340/435 |
| 2012/0072097 A1 | 3/2012 | Ohta et al. | |
| 2012/0306637 A1 * | 12/2012 | McGough | B60K 37/06 340/439 |
| 2013/0241747 A1 | 9/2013 | Hatakeyama et al. | |

FOREIGN PATENT DOCUMENTS

| | | |
|---|---|---|
| JP | A-07-061257 | 3/1995 |
| JP | A-08-115491 | 5/1996 |
| JP | A-11-144200 | 5/1999 |
| JP | 2001-357498 A | 12/2001 |
| JP | A-2007-087337 | 4/2007 |
| JP | A-2007-280263 | 10/2007 |
| JP | A-2009-069885 | 4/2009 |
| JP | A-2010-137698 | 6/2010 |
| JP | A-2010-221806 | 10/2010 |
| JP | A-2011-001049 | 1/2011 |
| JP | A-2011-138363 | 7/2011 |
| WO | WO 2012/077202 A1 | 6/2012 |

\* cited by examiner

| L | COLOR | BRIGHTNESS |
|---|---|---|
| CLOSE | DARK | DARK |
| INTERMEDIATE | REFERENCE VALUE | REFERENCE VALUE |
| DISTANT | LIGHT | BRIGHT |

| θ | COLOR | BRIGHTNESS |
|---|---|---|
| LARGE | DARK | DARK |
| MEDIUM | REFERENCE VALUE | REFERENCE VALUE |
| SMALL | LIGHT | BRIGHT |

| VEHICLE BODY COLOR | NORMAL COLOR | ATTENTION CALLING COLOR | WARNING COLOR | BRIGHTNESS |
|---|---|---|---|---|
| WHITISH | GREEN | ORANGE | RED | HIGH BRIGHTNESS |
| BLACKISH | GREEN | ORANGE | RED | LOW BRIGHTNESS |
| REDDISH | SKY BLUE | GREEN | YELLOW | MEDIUM BRIGHTNESS |
| BLUISH | GREEN | YELLOW | RED | MEDIUM BRIGHTNESS |
| YELLOWISH | BLUE | PINK | RED | MEDIUM BRIGHTNESS |

| DEGREE OF RISK | | POSITION OF OBJECT | | | |
|---|---|---|---|---|---|
| | | LEFT | FRONT | RIGHT | BOTH RIGHT AND LEFT |
| | HIGH | ◯ ○ | ◯ | ○ ◯ | ◯ ◯ |
| | LOW | ○ ○ | ○ | ○ ○ | ○ ○ |

VEHICLE INFORMATION TRANSMITTING APPARATUS

FIELD

The present invention relates to a vehicle information transmitting apparatus.

BACKGROUND

A technique that transmits support information to a driver by light has been proposed in the related art. For example, Patent Literature 1 discloses a technique of a vehicle driving support system. The vehicle driving support system includes: a plurality of light irradiation means for emitting light to a front glass at an incidence angle where light is reflected toward a driver's face by the front glass; and means for detecting the position of object information, which is the base of the detected transmission information, in the visual field of a driver and selectively operating the light irradiation means of which the extended line of the light reflected by the front glass is closest to the detected position among the light irradiation means.

CITATION LIST

Patent Literature

Patent Literature 1: Japanese Patent Application Laid-open No. 08-115491

SUMMARY

Technical Problem

However, even though information is transmitted by the light of the same light source, drivers feel in different manners. Further, since drivers feel in different manners according to situations, such as their physical conditions or feelings and weather at that time, there is a concern in that information cannot be appropriately transmitted.

An object of the invention is to provide a vehicle information transmitting apparatus that can appropriately transmit information to a driver by optical stimulus.

Solution to Problem

A vehicle information transmitting apparatus according to the present invention transmits information to a driver by optical stimulus and determines whether or not to change a mode of the stimulus on the basis of at least one of information about the driver, an operation input, and a behavior of a vehicle, the information about the driver, the operation input, and the behavior being obtained after the transmission of the information.

In the vehicle information transmitting apparatus, it is preferable that the mode of the stimulus is changed when it is determined that the information is not considered by the driver.

In the vehicle information transmitting apparatus, it is preferable that the mode of the stimulus is changed when at least one of the operation input and the behavior of the vehicle obtained after the transmission of the information is not based on the information transmitted to the driver.

In the vehicle information transmitting apparatus, it is preferable that the mode of the stimulus is changed when it is determined that a cause that the information is not considered by the driver resides in the mode of the stimulus.

In the vehicle information transmitting apparatus, it is preferable that it is determined that the information is not considered by the driver when at least one of the operation input and the behavior of the vehicle obtained after the transmission of the information is not based on the information transmitted to the driver.

In the vehicle information transmitting apparatus, it is preferable that it is confirmed whether or not the information continues to be transmitted to the driver by the stimulus when it is not determined that a cause that the information is not considered by the driver resides in the mode of the stimulus.

In the vehicle information transmitting apparatus, it is preferable that a correspondence between the mode of the stimulus and the determination of whether or not information transmitted by the stimulus of the mode is considered by the driver is stored, and it is determined whether or not a cause that the information is not considered by the driver resides in the mode of the stimulus on the basis of the stored correspondence.

In the vehicle information transmitting apparatus, it is preferable that the mode of the stimulus includes at least one of the brightness of the light, the color of the light, the size of the light to be projected, the shape of the light to be projected, the blinking cycle of the light, the gradient of the change of the brightness of the light, and the timing of the stimulus.

Advantageous Effects of Invention

The vehicle information transmitting apparatus according to the invention determines whether or not to change a mode of the stimulus on the basis of at least one of information about the driver, an operation input, and a behavior of a vehicle, the information about the driver, the operation input, and the behavior being obtained after the transmission of the information. Accordingly, the vehicle information transmitting apparatus according to the invention has an effect that the information can be appropriately transmitted to the driver.

DESCRIPTION OF EMBODIMENTS

A vehicle information transmitting apparatus according to an embodiment of the invention will be described in detail below with reference to the drawings. Meanwhile, the invention is not limited by this embodiment. Further, components of the following embodiment include components that can be easily supposed by those skilled in the art and substantially the same components.

Embodiment

Figure 1:
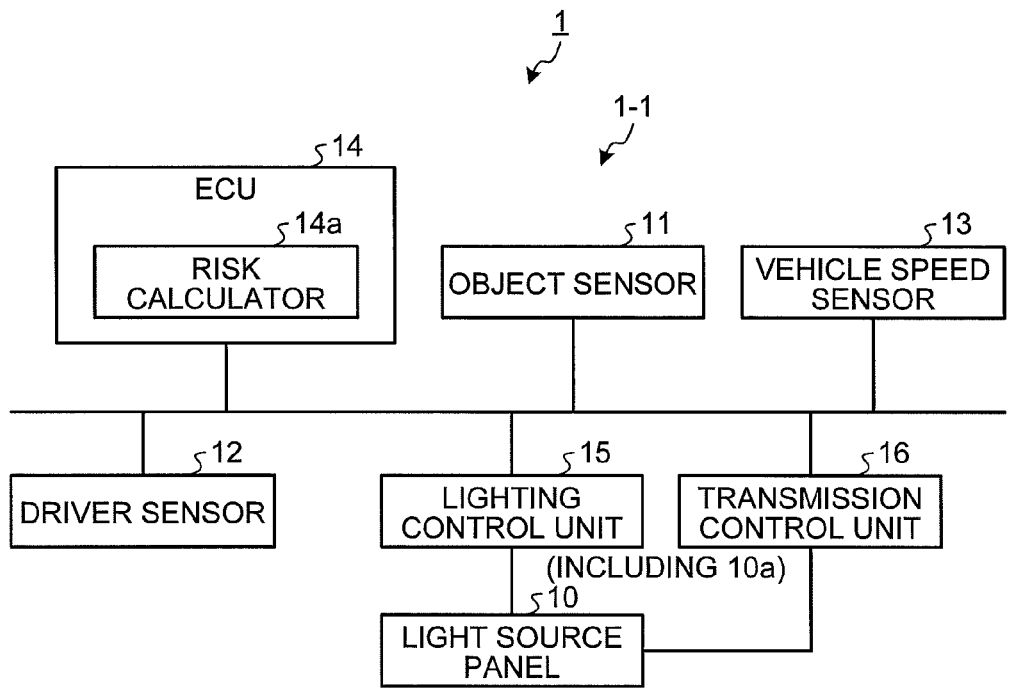
FIG. 1 is a block diagram illustrating an example of the structure of a vehicle information transmitting apparatus according to an embodiment.

An embodiment will be described with reference to FIGS. 1 to 31. This embodiment relates to a vehicle information transmitting apparatus. FIG. 1 is a block diagram illustrating an example of the structure of vehicle information transmitting apparatus 1-1 according to the embodiment.

A method of providing visual stimulus to the peripheral view of a driver is examined to prevent eyes from being fixed to a device when driver's attention is called to a dangerous object from normal driving and to reduce troublesomeness. Here, there is a case in which a driver drives a vehicle without considering support provided by optical stimulus such as a case in which a driver does not take an avoidance action regardless of the fact that a system provides the information about a dangerous object by optical stimulus. In this case, there is a possibility that the driver's notice of the calling of attention by optical stimulus is late or support is unnecessary or troublesome for a driver.

The vehicle information transmitting apparatus 1-1 of this embodiment transmits information to a driver by optical stimulus. The vehicle information transmitting apparatus 1-1 determines whether or not a driver drives a vehicle in consideration of support information. When determining that a driver does not drive a vehicle in consideration of support information, the vehicle information transmitting apparatus 1-1 determines whether or not a method of presenting optical stimulus is a cause. When determining that a cause that support information is not considered is a method of giving optical stimulus, the vehicle information transmitting apparatus 1-1 changes the method of giving optical stimulus. Accordingly, according to the vehicle information transmitting apparatus 1-1 of this embodiment, it is possible to appropriately transmit information to a driver by optical stimulus.

Further, when a support effect is not expected regardless of a method of giving optical stimulus, the vehicle information transmitting apparatus 1-1 confirms a driver's intention of continuing support and ends support if support is unnecessary. Accordingly, according to the vehicle information transmitting apparatus 1-1 of this embodiment, support is not performed for a driver who does not need optical stimulus. Therefore, it is possible to reduce troublesomeness. That is, the vehicle information transmitting apparatus 1-1 of this embodiment can provide information to a driver who needs support provided by appropriate optical stimulus corresponding to the driver's way of feeling and the like.

The vehicle information transmitting apparatus (vehicle information transmission system) 1-1 according to this embodiment is an apparatus that irradiates a front window glass with light of a plurality of light sources (LEDs: light-emitting diodes) mounted (arranged) on an instrument panel in the shape of an array (a plurality of rows or a plurality of columns) and notifies (calls attention or warns) a driver of the presence position or presence direction of a dangerous object (for example, a pedestrian, a bicycle, an automobile, and a blind spot) present around a subject vehicle by a virtual image that is caused by the light. Examples of the structure of this apparatus, the operation performed by this apparatus, and the like will be described in detail below with reference to the drawings.

Meanwhile, the mounting position of light source will be mainly described as the instrument panel in the following description, but may be, for example, a meter panel or the like. Further, the light source will be mainly described as a single-color LED, but may be a full-color LED or bulb or the like. Furthermore, the irradiation destination of light (the display destination of a virtual image) will be mainly described as a front window glass, but may be, for example, an A pillar, a side-view mirror, a meter panel, an instrument panel, or the like. Moreover, contents notified to a driver will be mainly described as a dangerous object (risk), but may be, for example, route guidance, the receipt of a mail, the state and the physical condition of a driver (for example, whether a driver is awake, sleeping, or the like), the state of a subject vehicle (for example, the state of economic driving or the like), or the like.

Further, means for detecting a dangerous object will be described as an object sensor, but may be, for example, image recognition using a camera, communication such as inter-vehicle communication or road-to-vehicle communication, navigation information (for example, a map, a database, or the like about a dangerous place), or the like. Furthermore, the position and the orientation facilitating notification will be mainly described as the left or right that is seen from a driver, but may be, for example, the front, rear, or the like that is seen from a driver. Moreover, the display shape of a virtual image will be mainly described as a linear shape (sequence of points), but may be, for example, a figure such as an icon, a character, or a sign. Further, not only the presence position or the presence direction of a dangerous object but also the contents of the dangerous object (for example, whether or not the dangerous object is a pedestrian, a bicycle, an automobile, or a blind spot, or the like) may be notified. Furthermore, the mode of notification (the form of notification or the method of notification) will be mainly described as light, but may be, for example, a mode, which can be noticed by a human, such as sound (voice) or an operation reaction force.

The vehicle information transmitting apparatus 1-1 is mounted on a vehicle 1, and includes a light source panel 10 that includes a plurality of light sources 10a and a mechanism adjusting the penetration of light (specifically, the brightness of light) of the light sources 10a, an object sensor 11, a driver sensor 12, a vehicle speed sensor 13, an ECU (electronic control unit) 14 that includes a risk calculator 14a, a lighting control unit 15, and a transmission control unit 16.

The object sensor 11 detects external environment around the vehicle 1 (for example, information about an object, such as a pedestrian, a bicycle, an automobile, or a blind spot (for example, the shade of a building, the side facing a curve, the back of the vehicle, or the like), a road shape, such as a linear shape, a left curved shape, or a right curved shape). The driver sensor 12 detects a driver's gazing point or a driver's gazing direction. The vehicle speed sensor 13 detects the vehicle speed of the vehicle 1. The risk calculator 14a calculates (estimates) the degree of risk around the vehicle 1 on the basis of the external environment around the vehicle 1 that is detected by the object sensor 11, a gazing point or a gazing direction that is detected by the driver sensor 12, the vehicle speed that is detected by the vehicle speed sensor 13, and the like.

Figure 2:
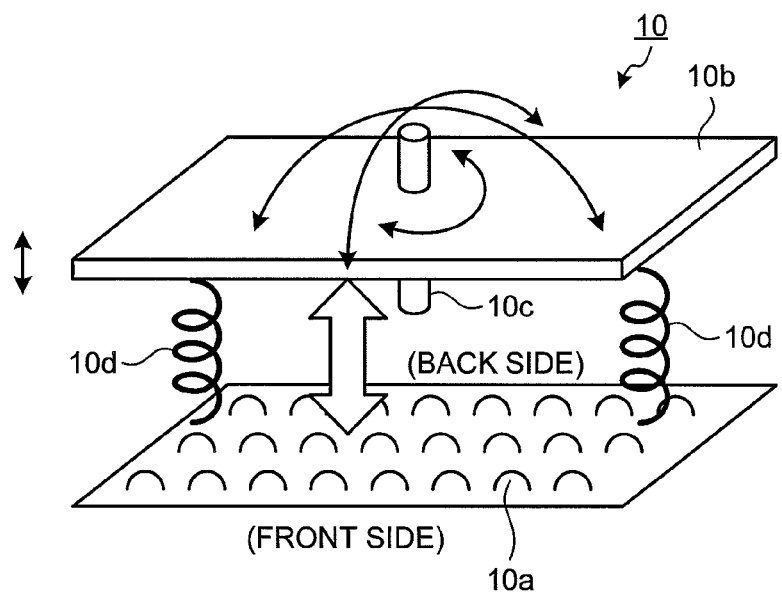
FIG. 2 is a diagram illustrating an example of the structure of a light source panel.

FIG. 2 is a diagram illustrating an example of the structure of the light source panel 10. In FIG. 2, reference numeral 10b denotes a diffuser plate, reference numeral 10c denotes a shaft member, and reference numeral 10d denotes a spring. The plurality of light sources 10a are disposed on the light source panel 10 in the shape of an array having a plurality of rows or a plurality of columns so as to be capable of performing the irradiation of light in a lateral direction (left-and-right direction) and a longitudinal direction (a height direction or an up-and-down direction). To project red, yellow, and green virtual images of horizontal three rows on the front window glass in this order from above, light sources 10a emitting reddish light are disposed on a row corresponding to the front side seen from a driver when the light source panel 10 is installed, light sources 10a emitting yellowish light are disposed on a middle row, and light sources 10a emitting greenish light are disposed on a row corresponding to the back side.

A diffuser plate 10b and a shaft member 10c that wholly or partially adjust the penetration of the light of the light sources 10a (the blurring of light/the diffusibility of light) in association with the positions of the light sources 10a, and a plurality of springs 10d that maintain the maximum distance between the light source 10a and the diffuser plate 10b at the time of breakdown and have a fail-safe function are disposed on the light source panel 10. A power unit (not illustrated) such as a motor that electromagnetically or electrically realizes three rotational motions (motions in the up-and-down direction, the left-and-right direction, and the torsional direction), that is, the pitch, the yaw, and the roll of the diffuser plate 10b is disposed on the light source panel 10.

The diffuser plate 10b is a thin plate-like member that is made of, for example, polypropylene, polycarbonate, or the like. The shaft member 10c is a rod-like member that functions as a shaft of the three rotational motions of the diffuser plate 10b. Meanwhile, the positions or the number of the springs 10d may be set to positions or the number where the maximum distance between the light source 10a and the diffuser plate 10b can be maintained at the time of breakdown. Further, a Fresnel lens may be inserted above or below the diffuser plate 10b to increase the irradiation area of light to a wider range.

Figure 3:
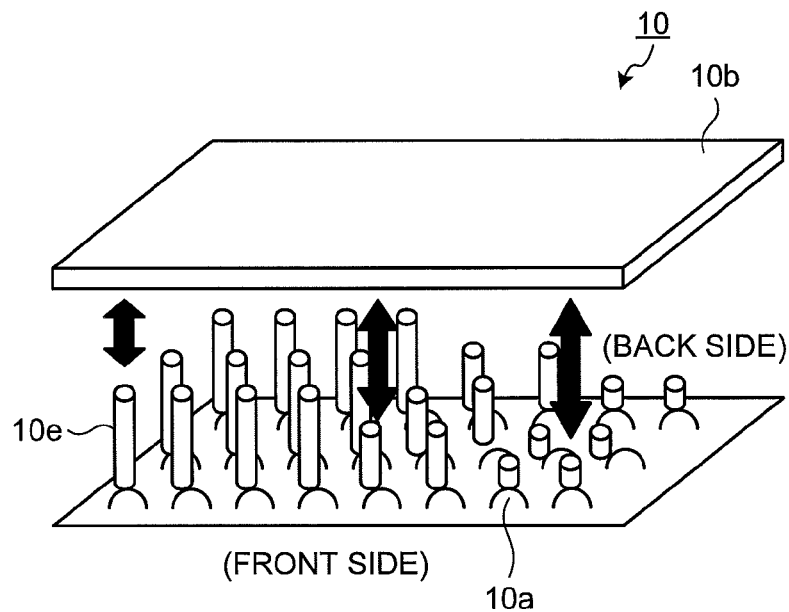
FIG. 3 is a diagram illustrating another example of the structure of the light source panel.

FIG. 3 is a diagram illustrating another example of the structure of the light source panel 10. In FIG. 3, reference numeral 10e denotes a light guide member. A diffuser plate 10b and light guide members 10e, which adjust the penetration of the light of the light sources 10a, are disposed on the light source panel 10. The light guide member 10e is, for example, an optical fiber or the like and is disposed so as to correspond to each of the light sources 10a as illustrated in FIG. 3. A power unit (not illustrated), which realizes the adjustment of a distance between the diffuser plate 10b and the light guide member 10e, is disposed on the light source panel 10. It is possible to independently adjust the penetration of light emitted from each light source 10a by employing the structure illustrated in FIG. 3.

Figure 4:
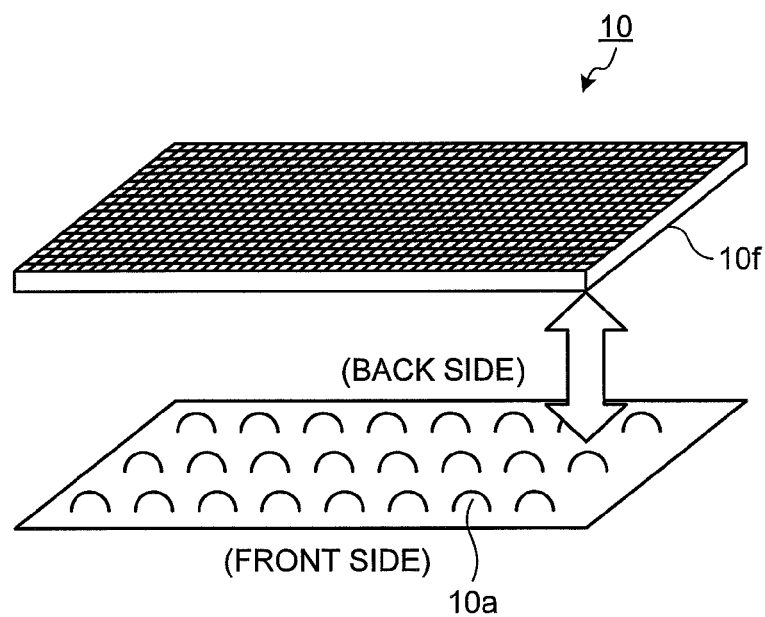
FIG. 4 is a diagram illustrating another example of the structure of the light source panel.

FIG. 4 is a diagram illustrating another example of the structure of the light source panel 10. In FIG. 4, reference numeral 10f denotes a liquid crystal panel. A liquid crystal panel 10f, which adjusts the penetration of the light of the light sources 10a, is disposed above the light source panel 10 so that a distance between the liquid crystal panel 10f and the light source 10a is fixed. It is possible to blur light so that the aperture ratio of the liquid crystal panel 10f is reduced toward the periphery from the center, by employing the structure illustrated in FIG. 4.

Figure 5:
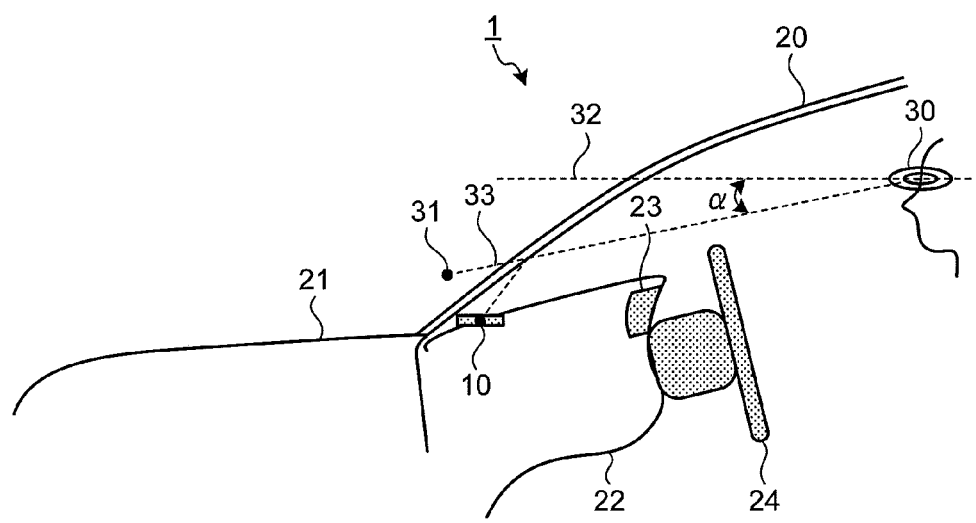
FIG. 5 is a diagram illustrating an example of the mounting position of the light source panel of a vehicle.

FIG. 5 is a diagram illustrating an example of the mounting position of the light source panel 10 of the vehicle 1. In FIG. 5, reference numeral 20 denotes a front window glass having a double image suppressing structure such as tapered glass, reference numeral 21 denotes a hood, reference numeral 22 denotes an instrument panel, reference numeral 23 denotes a meter panel, reference numeral 24 denotes a steering wheel, reference numeral 30 denotes a driver's eye point, reference numeral 31 denotes a virtual image that is caused by light emitted from the light source panel 10, reference numeral 32 denotes a horizontal line that passes through the eye point 30, and reference numeral 33 denotes an optical path of the light emitted from the light source panel 10.

Figure 6:
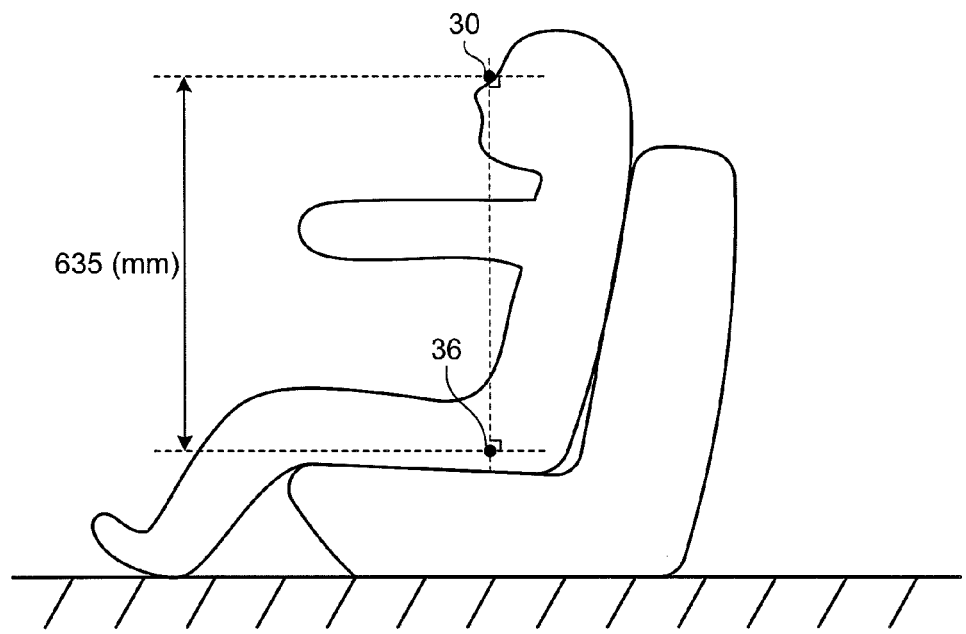
FIG. 6 is a diagram illustrating an example of the definition of an eye point.

The light source panel 10 is installed on the instrument panel 22, but is particularly installed at a position where a virtual image 31 can be noticed by a driver on the lowermost layer of the peripheral visual field of the driver (for example, an angle α of depression from the horizontal line 32 passing through the eye point 30 is 5° or less). For example, the light source panel 10 is installed at a position that is closer to the front window glass 20 than the meter panel 23 (in other words, on the back side of the instrument panel 22 when seen from the eye point 30). Here, as illustrated in FIG. 6, the eye point 30 is a point corresponding to a height of 635 (mm) upward from a seating reference point 36, which is a hip joint point of a dummy when the dummy is seated on a seat on the basis of ISO 6549-1980, in a vertical direction (see Notification establishing details of safety standards of a road trucking vehicle [Nov. 9, 2005], Attachment 81 (technical standards of a directly-before-direct-difference check mirror) disclosed in homepage address http://www.mlit.go.jp/jidosha/kijyun/saimokubetten/saibet_0 81_00.pdf).

Figure 7:
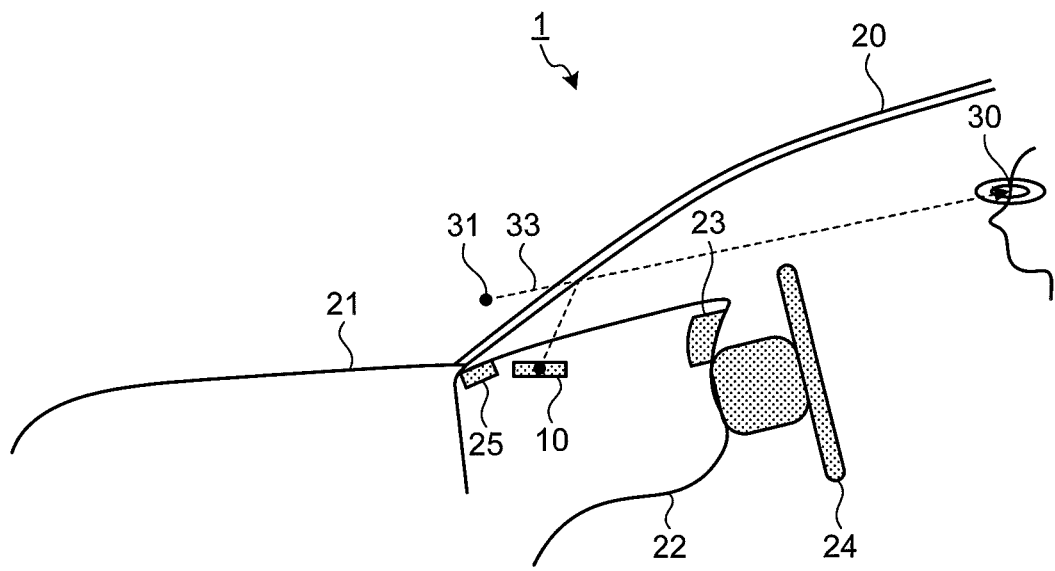
FIG. 7 is a diagram illustrating another example of the mounting position of the light source panel of a vehicle.
Figure 8:
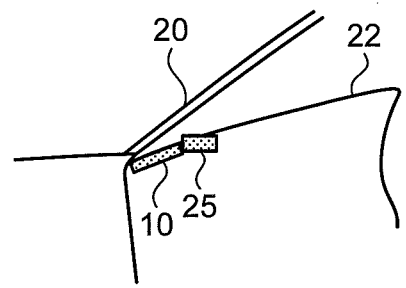
FIG. 8 is a diagram illustrating another example of the mounting position of the light source panel of a vehicle.

FIGS. 7 and 8 are diagrams illustrating of other examples of the mounting position of the light source panel 10 of the vehicle 1. In FIGS. 7 and 8, reference numeral 25 denotes a defroster blow-out part. For example, the light source panel 10 is installed at a front position (see FIG. 7) or a back position (see FIG. 8) of the defroster blow-out part 25 when seen from the eye point 30. For example, the light source panel 10 is installed below the surface of the instrument panel 22 (in other words, inside the instrument panel 22). For example, the light source panel 10 is embedded in the instrument panel 22.

Figure 9:
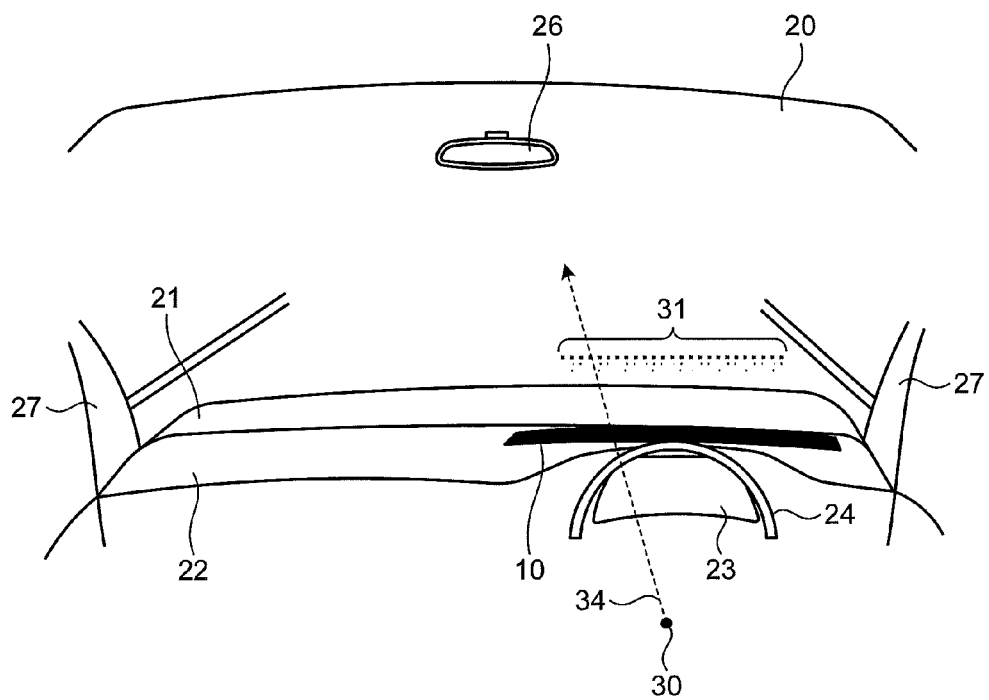
FIG. 9 is a diagram illustrating another example of the mounting position of the light source panel of a vehicle.

FIG. 9 is a diagram illustrating of another example of the mounting position of the light source panel 10 of the vehicle 1. In FIG. 9, reference numeral 26 denotes a rearview mirror, reference numeral 27 denotes an A pillar, and reference numeral 34 denotes a driver's gazing direction. For example, the light source panel 10 is installed on the instrument panel 22 at a position substantially in front of the driver. The light source panel 10 is installed on the instrument panel 22 so that the background of the virtual image 31 when seen from the eye point 30 becomes, for example, the foreground (for example, a road, a preceding vehicle, or the like).

Figure 10:
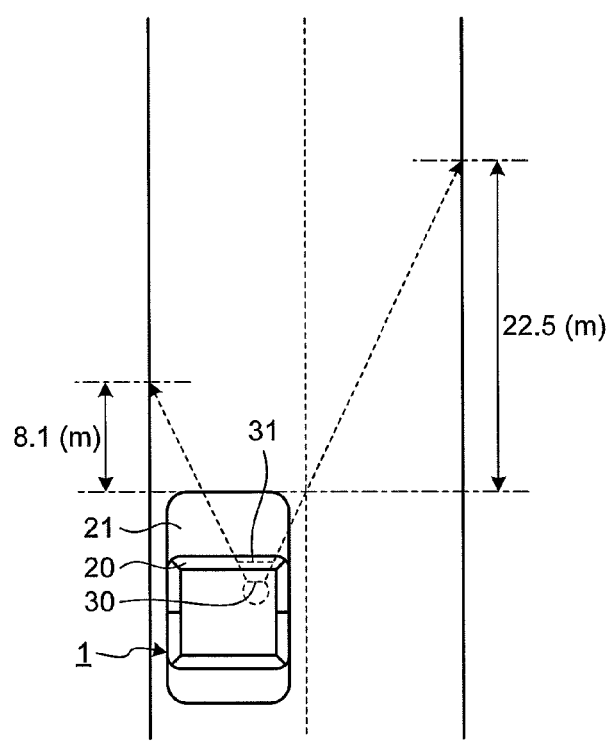
FIG. 10 is a diagram illustrating an example of the display range of a virtual image when seen from the upper side of a vehicle.

FIG. 10 is a diagram illustrating an example of the display range of the virtual image 31 when seen from the upper side of the vehicle 1. When the vehicle 1 on which the light source panel 10 is mounted on the instrument panel 22 as described above is present on a road of which the sidewalk has a width of 1 (m) and the lane has a width of 3.2 (m), the display range of the virtual image 31 seen from the eye point 30 (the range of a dangerous object) becomes a range that is illustrated in FIG. 10 and corresponds to 8.1 (m) on the left side and 22.5 (m) on the right side.

Returning to FIG. 1, the lighting control unit 15 forms a normal lighting pattern, an attention-calling lighting pattern, or a warning lighting pattern (for example, lighting contents or a lighting mode corresponding to the irradiation position of light on the front window glass 20, the irradiation area of light projected on the front window glass 20, the color of light, the brightness of light, the shape of light, the flickering/blinking cycle of light, the variation of the color or brightness of light per unit change (the unit variation of the color or brightness), or the like) on the basis of the external environment around the vehicle 1 that is detected by the object sensor 11, a driver's gazing point or a driver's gazing direction that is detected by the driver sensor 12, the vehicle speed of the vehicle 1 that is detected by the vehicle speed sensor 13, and the degree of risk around the vehicle 1 that is calculated by the risk calculator 14a, and the like; and performs the lighting control of each of the light sources 10a (for example, the adjustment of an applied voltage, or the like) according to the formed lighting pattern.

Figures 11, 12:
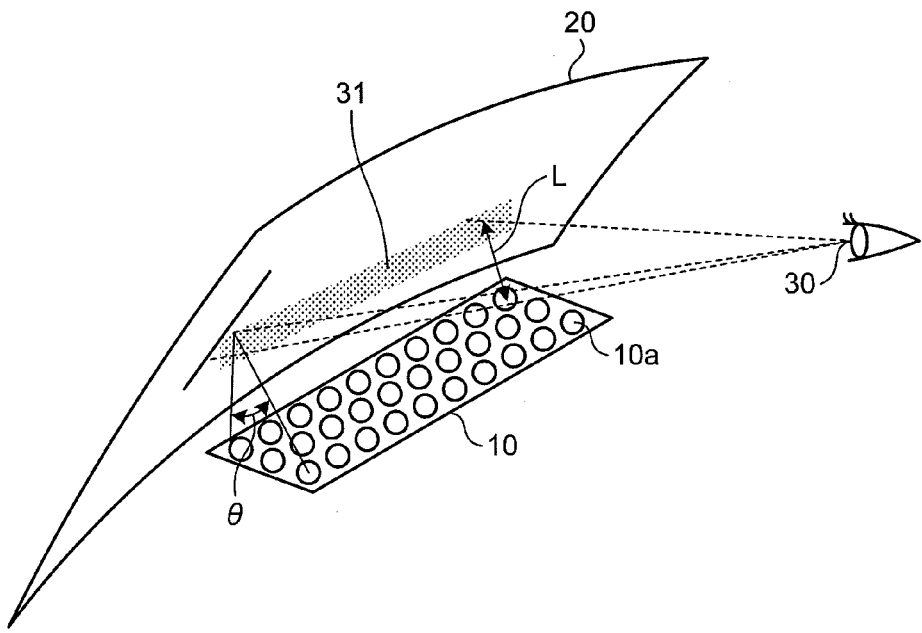
FIG. 11 is a diagram illustrating an example of a method of adjusting the color and the brightness of light of light sources.
FIG. 12 is a diagram illustrating an example of a map that defines a relationship between a distance or an angle and a color/brightness.
Figures 13, 14:
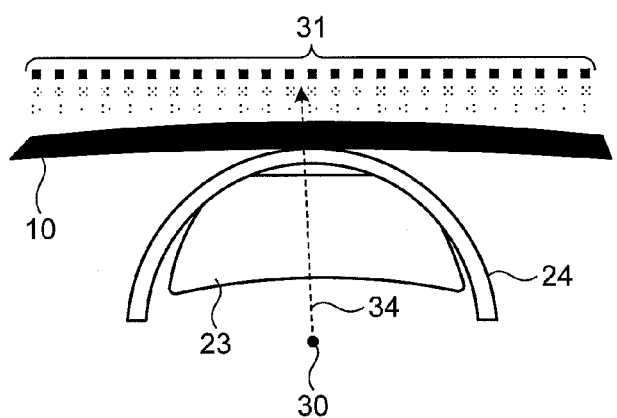
FIG. 13 is a diagram illustrating an example of a map that defines a relationship among a vehicle body color, a normal color, an attention calling color, a warning color, and brightness.
FIG. 14 is a diagram illustrating a virtual image that is in a clear state.
Figure 15:
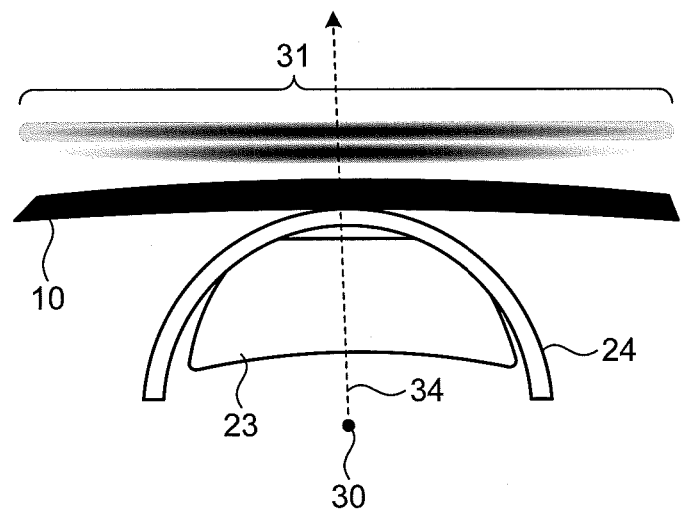
FIG. 15 is a diagram illustrating a virtual image that is in a blurred state.

Here, one example of a method of adjusting (calibrating) the color and the brightness of the light of the light sources 10a will be described with reference to FIGS. 11 to 13. FIG. 11 is a diagram illustrating an example of a method of adjusting the color and the brightness of light of the light sources 10a, FIG. 12 is a diagram illustrating an example of a map that defines a relationship between a distance L and a color/brightness and an example of a map that defines a relationship between an angle θ and a color/brightness, and FIG. 13 is a diagram illustrating an example of a map that defines a relationship among a vehicle body color, a normal color, an attention calling color, a warning color, and brightness.

As illustrated in FIG. 11, the color and the brightness of each of the light sources 10a are adjusted according to a distance L and/or an angle θ in advance. For example, the color and the brightness of each of the light sources 10a are adjusted on the basis of the map (see FIG. 12) that defines the relationship between the distance L and a color/brightness and/or the map (see FIG. 12) that defines the relationship between the angle θ and a color/brightness. Here, the distance L is a distance between the light source 10a and the irradiation position of the light of the light source 10a on the front window glass 20. The angle θ is an angle between a line segment, which connects the arrangement position of the light source 10a with the irradiation position of light, and the front window glass 20.

The color and the brightness of each of the light sources 10a at a normal time and at the time of the calling of attention and warning are adjusted according to, for example, the color of the instrument panel, the A pillar, the side-view mirror, or the like in advance. For example, the color and the brightness of each of the light sources 10a at a normal time and at the time of the calling of attention and warning are adjusted on the basis of the map (see FIG. 13) that defines a relationship among a vehicle body color, a normal color, an attention calling color, a warning color, and brightness. The state of adjustment of these colors and brightness is stored in the storage area of the lighting control unit 15.

Meanwhile, the lighting control unit 15 may adjust the brightness or color of light by the ON/OFF of a headlight, a light control sensor, or the like. For example, the lighting control unit 15 may reduce the brightness of light at night. Further, the lighting control unit 15 may adjust the brightness, the color, the cycle (flickering), and the like of light according to the degree of the reliability of the degree of risk that is estimated by the risk calculator 14a. Furthermore, the lighting control unit 15 may stop the light, which is noticed by a driver, of the light, which is lightened, and may reduce the brightness or color of the light on the basis of a driver's gazing point or a driver's gazing direction that is detected by the driver sensor 12. Moreover, the lighting control unit 15 may also notify a driver of the contents of a dangerous object (for example, whether or not the dangerous object is a person or a car, or the like) according to the presence position or the presence direction of the dangerous object.

Returning to FIG. 1, the transmission control unit 16 adjusts the penetration (blurring/diffusibility) of light of the light source 10a of the light source panel 10 on the basis of the external environment around the vehicle 1 that is detected by the object sensor 11, a driver's gazing point or a driver's gazing direction that is detected by the driver sensor 12, the vehicle speed of the vehicle 1 that is detected by the vehicle speed sensor 13, the degree of risk around the vehicle 1 that is calculated by the risk calculator 14a, the lighting pattern that is formed by the lighting control unit 15, and the like. In other words, the lighting control unit 15 can adjust the degree of the clarity of light, that is, the virtual image 31 that is projected on the front window glass 20.

For example, when the lighting control unit 15 lights the light sources 10a according to the attention-calling lighting pattern, the transmission control unit 16 makes the distances between the light sources 10a and the diffuser plate 10b be long as a whole if the light source panel 10 illustrated in FIG. 2 is used, makes the distances between the diffuser plate 10b and the light guide members 10e be long as a whole if the light source panel 10 illustrated in FIG. 3 is used, and makes the aperture ratio of the liquid crystal panel 10f be small as a whole if the light source panel 10 illustrated in FIG. 4 is used. Accordingly, it is possible to change the virtual image 31 to a blurred state illustrated in FIG. 15 in which the virtual image is blurred from a clear state illustrated in FIG. 14. That is, it is possible to blur the virtual image 31.

Further, the transmission control unit 16 adjusts the distances between the light sources 10a and the diffuser plate 10b when the light source panel 10 illustrated in FIG. 2 is used, adjusts the distances between the diffuser plate 10b and the light guide members 10e when the light source panel 10 illustrated in FIG. 3 is used, and adjusts the aperture ratio of the liquid crystal panel 10f when the light source panel 10 illustrated in FIG. 4 is used, according to the degree of risk that is calculated by the risk calculator 14a. When the degree of risk is low, the transmission control unit 16 makes the distances between the light sources 10a and the diffuser plate 10b be long as a whole, makes the distances between the diffuser plate 10b and the light guide members 10e be long as a whole, and makes the aperture ratio be small as a whole. Furthermore, when the degree of risk is high, the transmission control unit 16 makes the distances between the light sources 10a and the diffuser plate 10b be short as a whole, makes the distances between the diffuser plate 10b and the light guide members 10e be short as a whole, and makes the aperture ratio be large as a whole. Accordingly, it is possible to project the virtual image 31 in a clear state when risk is high, and to project the virtual image 31 in a blurred state in which the virtual image is blurred when risk is low.

Moreover, when the lighting control unit 15 lights the light sources 10a according to a lighting pattern that displays specific information (for example, characters, icons, or the like), the transmission control unit 16 makes the distances between the light sources 10a and the diffuser plate 10b be short as a whole if the light source panel 10 illustrated in FIG. 2 is used, makes the distances between the diffuser plate 10b and the light guide members 10e be short as a whole if the light source panel 10 illustrated in FIG. 3 is used, and makes the aperture ratio of the liquid crystal panel 10f be large as a whole if the light source panel 10 illustrated in FIG. 4 is used. Accordingly, it is possible to project the virtual image 31, which corresponds to the specific information, in a clear state.

Figure 16:
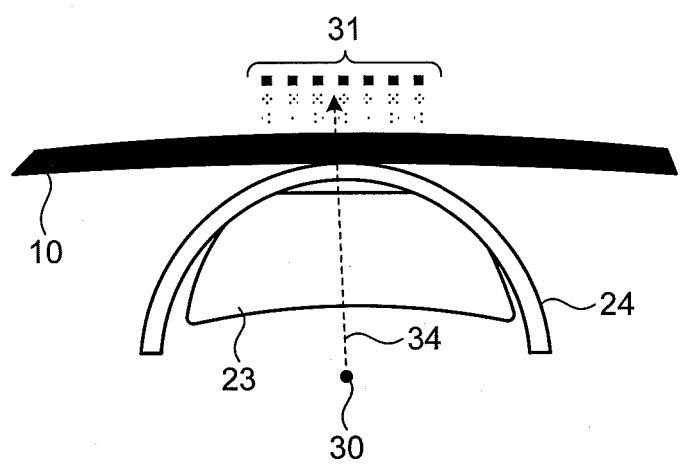
FIG. 16 is a diagram illustrating another example of a virtual image that is in a clear state.
Figure 17:
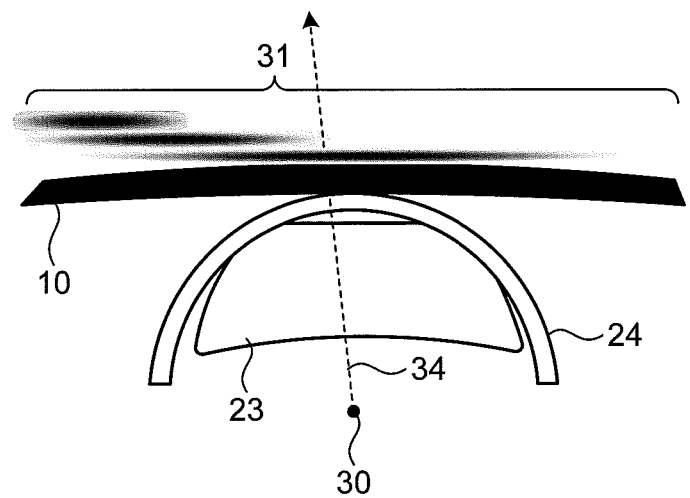
FIG. 17 is a diagram illustrating another example of a virtual image that is in a blurred state.

Further, the transmission control unit 16 adjusts the distances between the light sources 10a and the diffuser plate 10b when the light source panel 10 illustrated in FIG. 2 is used, adjusts the distances between the diffuser plate 10b and the light guide members 10e when the light source panel 10 illustrated in FIG. 3 is used, and adjusts the aperture ratio of the liquid crystal panel 10f when the light source panel 10 illustrated in FIG. 4 is used, according to the vehicle speed of the vehicle 1 that is detected by the vehicle speed sensor 13. When the vehicle speed is equal to or lower than a predetermined value (for example, when the vehicle 1 stops, or the like), the transmission control unit 16 makes the distances between the light sources 10a and the diffuser plate 10b be short as a whole, makes the distances between the diffuser plate 10b and the light guide members 10e be short as a whole, and makes the aperture ratio be large as a whole. Meanwhile, when the vehicle speed exceeds the predetermined value (for example, when the vehicle 1 is traveling, or the like), the transmission control unit 16 makes the distances between the light sources 10a and the diffuser plate 10b be long as a whole, makes the distances between the diffuser plate 10b and the light guide members 10e be long as a whole, and makes the aperture ratio be small as a whole. Accordingly, it is possible to project the virtual image 31 in a clear state as illustrated in FIG. 16 when the vehicle 1 stops, and to project the virtual image 31 in a blurred state in which the virtual image is blurred as illustrated in FIG. 17 when the vehicle 1 is traveling.

Figure 18:
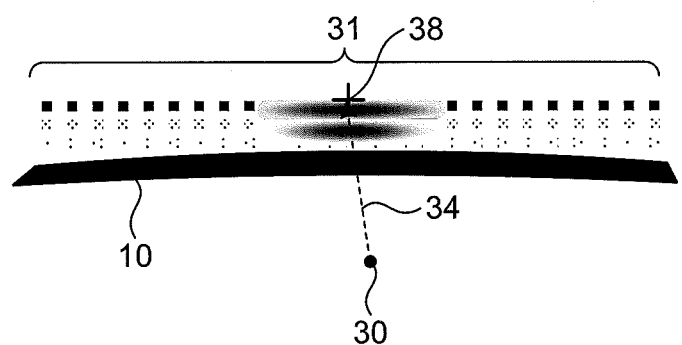
FIG. 18 is a diagram illustrating a virtual image of which a part seen by a driver selectively has become blurred.

Furthermore, when the light source panel 10 illustrated in FIG. 2 is used, the transmission control unit 16 makes the distance between the light source 10a and only a portion of the diffuser plate 10b, which corresponds to the arrangement position of the light source 10a emitting light to the vicinity of a driver's gazing point 38 detected by the driver sensor 12, be partially long. When the light source panel 10 illustrated in FIG. 3 is used, the transmission control unit 16 makes the distance between only the light guide member 10e, which is disposed on the light source 10a emitting light to the vicinity of the gazing point 38, and the diffuser plate 10b be partially long. When the light source panel 10 illustrated in FIG. 4 is used, the transmission control unit 16 makes the aperture ratio of only a portion of the liquid crystal panel 10f, which corresponds to the arrangement position of the light source 10a emitting light to the vicinity of a driver's gazing point 38, be small. Accordingly, it is possible to selectively project only a portion (a portion near the gazing point 38) of the virtual image 31, which is seen by a driver, in a blurred state in which the virtual image is blurred as illustrated in FIG. 18.

Figure 19:
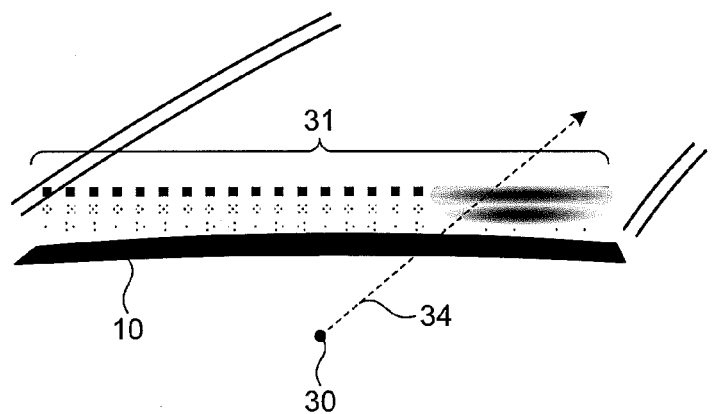
FIG. 19 is a diagram illustrating a virtual image of which a part in a curve direction selectively has become blurred.

Moreover, the transmission control unit 16 adjusts the penetration of the light of the light sources 10a of the light source panel 10 according to a road shape, such as a left curved shape or a right curved shape. When the light source panel 10 illustrated in FIG. 2 is used, the transmission control unit 16 makes the distance between the light source 10a and only a portion of the diffuser plate 10b, which corresponds to the arrangement position of the light source 10a emitting light in a direction in which the road shape at which a driver gazes is changed (for example, a right direction in the case of a right curved shape and a left direction in the case of a left curved shape), be partially long. When the light source panel 10 illustrated in FIG. 3 is used, the transmission control unit 16 makes the distance between only the light guide member 10e, which is disposed on the light source 10a emitting light in a direction in which the road shape is changed, and the diffuser plate 10b be partially long. When the light source panel 10 illustrated in FIG. 4 is used, the transmission control unit 16 makes the aperture ratio of only a portion of the liquid crystal panel 10f, which corresponds to the arrangement position of the light source 10a emitting light in a direction in which the road shape is changed, be small. Accordingly, it is possible to selectively project only a portion (a portion near the gazing direction 34) of the virtual image 31, which corresponds to the curve direction at which a driver gazes, in a blurred state in which the virtual image is blurred as illustrated in FIG. 19.

Further, the transmission control unit 16 adjusts the penetration of the light of the light sources 10a of the light source panel 10 according to the distance between the central visual field of a driver (the driver's gazing point 38 detected by the driver sensor 12) and the virtual image 31. When the light source panel 10 illustrated in FIG. 2 is used, the transmission control unit 16 makes the distance between the light source 10a, which is relatively close to the gazing point 38, and the diffuser plate 10b be relatively long, makes the distance between the light source 10a, which is relatively distant from the gazing point 38, and the diffuser plate 10b be relatively short, and makes the distance between the light source 10a, which is distant from the gazing point 38 by a relatively intermediate distance, and the diffuser plate 10b be relatively intermediate.

Figure 20:
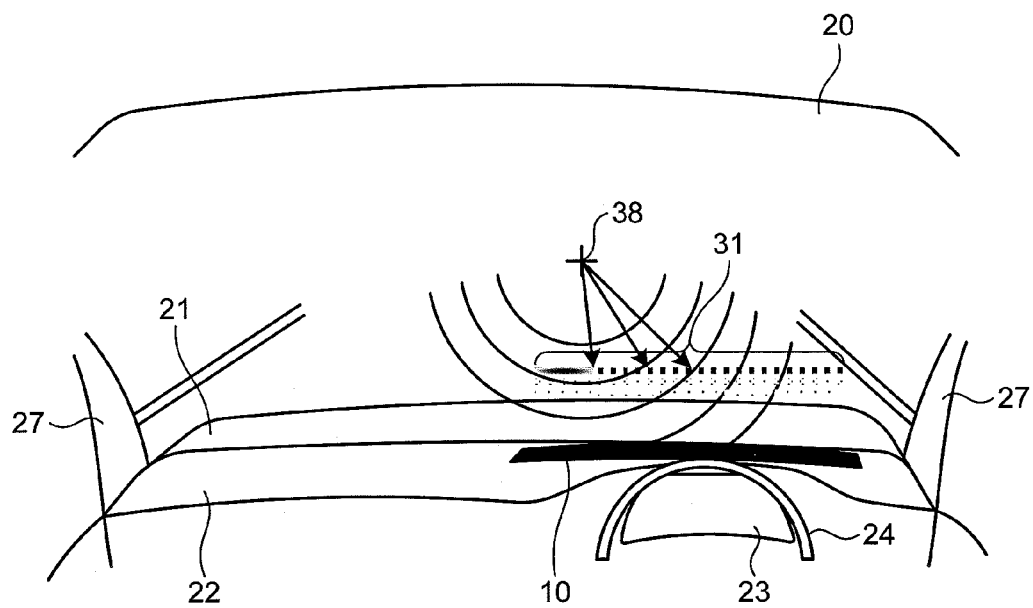
FIG. 20 is a diagram illustrating a virtual image of which a position close to a gazing point has become blurred.

When the light source panel 10 illustrated in FIG. 3 is used, the transmission control unit 16 makes the distance between the light guide member 10e, which is disposed on the light source 10a relatively close to the gazing point 38, and the diffuser plate 10b be relatively long, makes the distance between the light guide member 10e, which is disposed on the light source 10a relatively distant from the gazing point 38, and the diffuser plate 10b be relatively short, and makes the distance between the light guide member 10e, which is disposed on the light source 10a distant from the gazing point 38 by a relatively intermediate distance, and the diffuser plate 10b be relatively intermediate. When the light source panel 10 illustrated in FIG. 4 is used, the transmission control unit 16 makes the aperture ratio of a portion of the liquid crystal panel 10f, which corresponds to the arrangement position of the light source 10a relatively close to the gazing point 38, be relatively small, makes the aperture ratio of a portion of the liquid crystal panel 10f, which corresponds to the arrangement position of the light source 10a relatively distant from the gazing point 38, be relatively large, and makes the aperture ratio of a portion of the liquid crystal panel 10f, which corresponds to the arrangement position of the light source 10a distant from the gazing point 38 by a relatively intermediate distance, be relatively intermediate. Accordingly, as illustrated in FIG. 20, it is possible to gradually change the virtual image 31 into a clear state from a blurred state toward a position, which is distant from the gazing point 38, from a position that is close to the gazing point 38.

Figure 21:
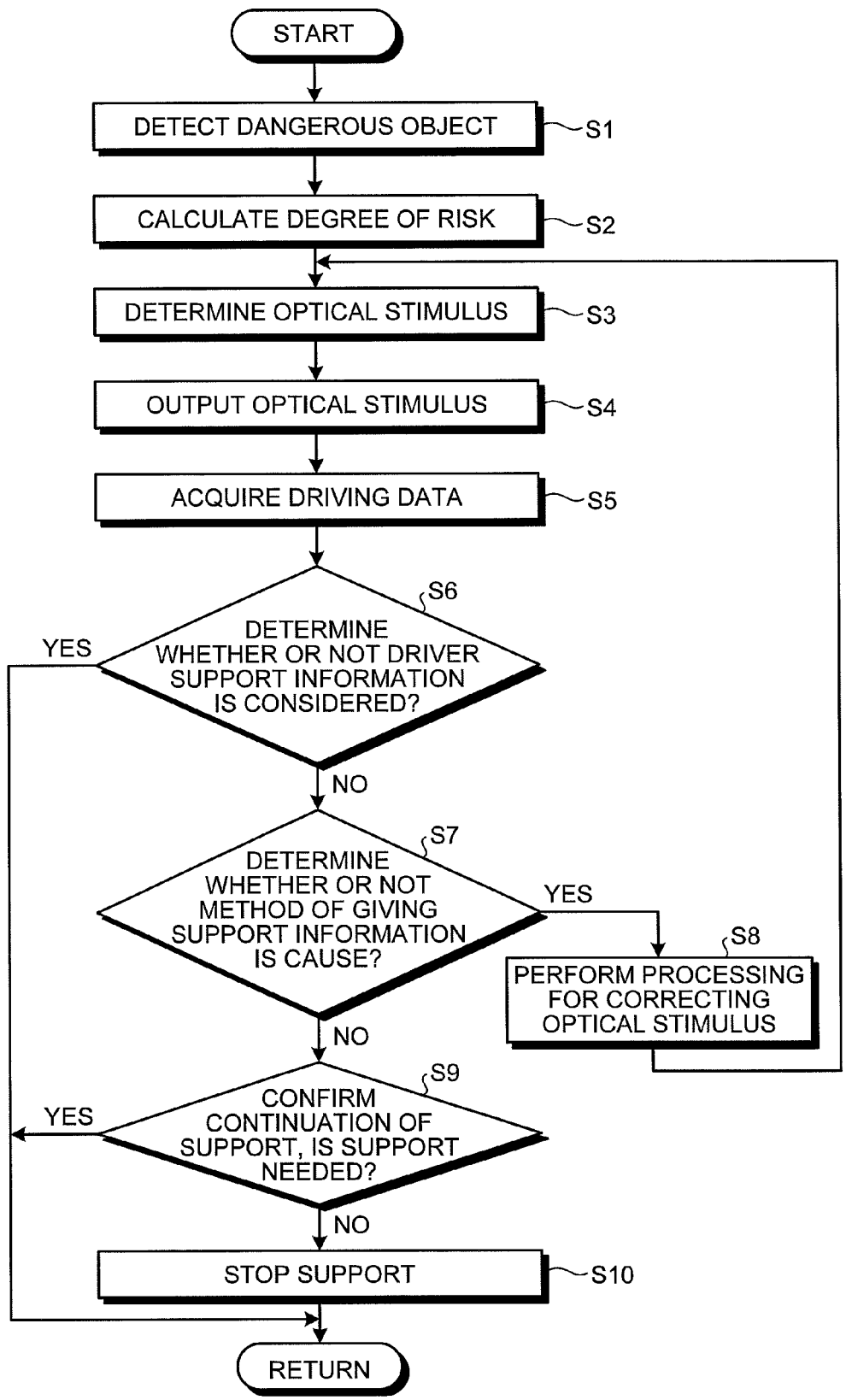
FIG. 21 is a flowchart according to control of the embodiment.

The operation of the vehicle information transmitting apparatus 1-1 of this embodiment will be described with reference to FIG. 21. A control flow illustrated in FIG. 21 is performed while the vehicle 1 is started, and is repeatedly performed, for example, at a predetermined interval.

First, dangerous objects (objects to be notified) are detected in Step S1 by the ECU 14. The ECU 14 acquires information about objects around the vehicle 1 (for example, a pedestrian, a bicycle, an automobile, a blind spot, and the like) on the basis of, for example, the detection results of the object sensor 11. The ECU 14 determines whether or not objects to be notified are present around the vehicle 1 on the basis of the acquired information. If objects to be notified are not detected by the object sensor 11, the ECU 14 determines that this time is a normal state (normal time). If objects to be notified are detected, the ECU 14 determines that this time is a state in which objects to be notified are present and the calling of attention or warning is needed. When Step S1 is performed, a control flow proceeds to Step S2.

The degree of risk is calculated in Step S2 by the ECU 14. The risk calculator 14a of the ECU 14 calculates the degrees of risk of the objects to be notified on the basis of, for example, the position information about the objects to be notified detected in Step S1. The risk calculator 14a estimates that an object of which the presence position cannot be confirmed among the detected objects to be notified has a low degree of risk (that the current state is a state in which the calling of attention is needed).

Further, the risk calculator 14a calculates a distance between the object to be notified of which the presence position could be confirmed and the vehicle 1 and the relative deceleration (which may be relative velocity or relative acceleration) of the object to be notified relative to the vehicle 1. If the distance between the object to be notified and the vehicle 1 is short, the risk calculator 14a estimates that the degree of risk is high (that the current state is a state in which warning is needed). If the distance is long, the risk calculator 14a estimates that the degree of risk is low (that the current state is a state in which the calling of attention is needed). Furthermore, if the relative deceleration of the object to be notified relative to the vehicle 1 is low, the risk calculator 14a estimates that the degree of risk is low (that the current state is a state in which the calling of attention is needed). If the relative deceleration is high, the risk calculator 14a estimates that the degree of risk is high (that the current state is a state in which warning is needed). When Step S2 is performed, the control flow proceeds to Step S3.

Figures 22, 23:
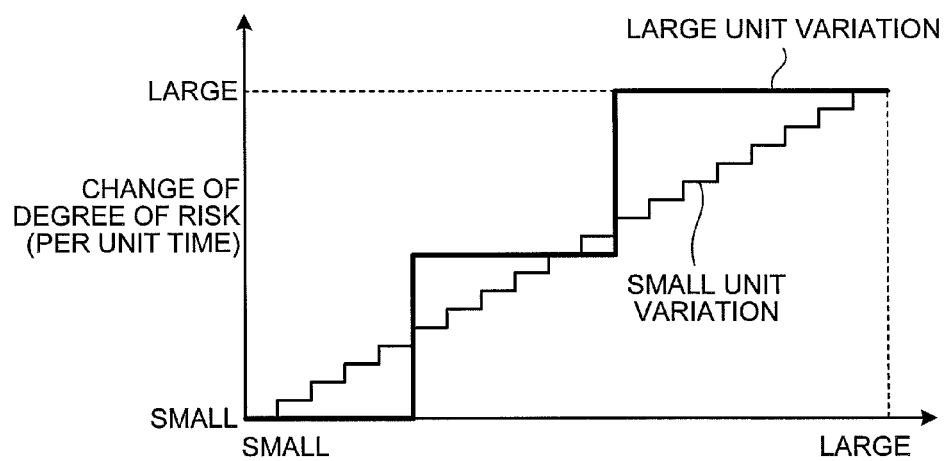
FIG. 22 is a diagram illustrating an example of a map that defines a relationship among the position and the degree of risk of an object to be notified and the irradiation position and the irradiation area of light.
FIG. 23 is a diagram illustrating an example of a relationship between the degree of risk and the variation of the color or brightness of light per unit change.

Optical stimulus is determined in Step S3 by the ECU 14. The lighting control unit 15 determines the mode of optical stimulus on the basis of the presence positions of the objects to be notified detected in Step S1 and the degrees of risk of the objects to be notified estimated in Step S2. Here, the mode of optical stimulus includes, for example, the irradiation position and the irradiation area of notification light in a lateral direction (vehicle width direction) and a longitudinal direction (vertical direction). The lighting control unit 15 determines the mode of optical stimulus with reference to, for example, a map illustrated in FIG. 22. FIG. 22 is a diagram illustrating an example of a map that defines a relationship among the position and the degree of risk of an object to be notified and the irradiation position and the irradiation area of light. For example, if the presence position of an object to be notified is on the left side, the irradiation position of optical stimulus for notification is set on the left portion of the front window glass 20. Likewise, if the presence position of an object to be notified is on the front side or the right side, the irradiation position of optical stimulus for notification is set on the front or right portion of the front window glass 20.

Further, the lighting control unit 15 refers to the map and determines the irradiation position and the irradiation area of attention-allocation light as necessary. If the irradiation position of notification light is on the left side, the irradiation position of optical stimulus for attention allocation is set on the right portion. If the irradiation position of notification light is on the right side, the irradiation position of optical stimulus for attention allocation is set on the left portion. Furthermore, if the irradiation position of notification light is on the front side or on both left and right sides, the irradiation position of attention-allocation light is not set.

The irradiation area of notification light is set to a large value at the time of warning of which the degree of risk of an object to be notified is high, and is set to a small value at the time of the calling of attention of which the degree of risk is low. The irradiation area of attention-allocation light is set to a value, which is smaller than the value of the irradiation area of notification light, so as to be distinctly different from the irradiation area of notification light at the time of warning of which the degree of risk of an object to be notified is high. Meanwhile, the irradiation area of attention-allocation light is set to a value, which is smaller than the value of the irradiation area of notification light somewhat, so as to be little different from the irradiation area of notification light at the time of the calling of attention of which the degree of risk of an object to be notified is low.

The lighting control unit 15 determines the color or brightness of notification light and attention-allocation light, according to the degrees of risk of the objects to be notified estimated in Step S2 and the maps illustrated in FIGS. 12 and 13. The lighting control unit 15 makes any one of the color and brightness different between notification light and attention-allocation light.

Further, the lighting control unit 15 determines the variation (unit variation) of the color or brightness of notification light per unit change on the basis of the degrees of risk of the objects to be notified that are estimated in Step S2. FIG. 23 is a diagram illustrating an example of a relationship between the degree of risk and the variation of the color or the brightness of light per unit change. When the variation of the degree of risk per unit time is large, the unit variation of a color and brightness is set to be large. When the variation of the degree of risk per unit time is small, the unit variation of a color and brightness is set to be small.

The lighting control unit 15 forms a notification (attention-calling or warning) lighting pattern that includes the irradiation position, the irradiation area, the color, the brightness, and the unit variation of light that have been determined. Meanwhile, when the state around the vehicle 1 is noticed as a normal state in which the calling of attention and warning are not needed in Step S1, the lighting control unit 15 forms a normal lighting pattern. The normal lighting pattern is formed on the basis of the maps illustrated in FIGS. 12 and 13, and is a lighting pattern that includes the color and the brightness of light different from the color and the brightness of notification light. When Step S3 is performed, the control flow proceeds to Step S4.

In Step S4, the lighting control unit 15 outputs the optical stimulus that is determined in Step S3. The lighting control unit 15 sets (corrects) the center position of the light source panel 10 at the time of lighting according to the road shape. The lighting control unit 15 performs the lighting control of each of the light sources 10a on the basis of the center position that is set and the notification or normal lighting pattern that is determined in Step S3. That is, the lighting control unit 15 controls the lighting/extinction of the respective light sources 10a, and controls the colors and the brightness of the light sources 10a that light up and the unit variation thereof. When Step S4 is performed, the control flow proceeds to Step S5.

Figure 24:
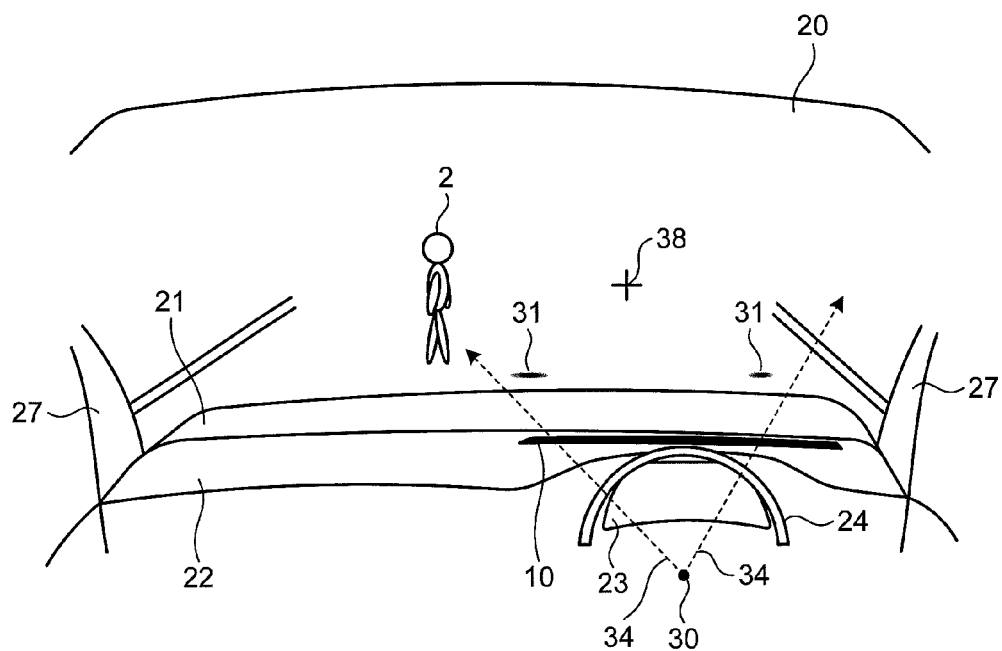
FIG. 24 is a diagram illustrating an example of a situation in which warning is needed.

According to the risk calculation operation and the lighting control operation having been described, a virtual image corresponding to the degree of risk of an object to be notified is formed in a situation in which warning is needed. FIG. 24 is a diagram illustrating an example of a situation in which warning is needed. In the situation illustrated in FIG. 24 (for example, a situation in which an object 2 to be notified having a high degree of risk is present on the left when seen from a driver), a notification virtual image 31 set according to the degree of risk of the object 2 to be notified is projected on a left portion. In addition, a dummy virtual image 31 for attention allocation, which is set so that the sum of the driver's attention allocation around the vehicle 1 becomes constant, is projected on a right portion. Accordingly, the bias of the driver's attention allocation around the vehicle 1 is suppressed in this situation, so that it is possible to uniformly maintain (uniformize) attention allocation.

Figure 25:
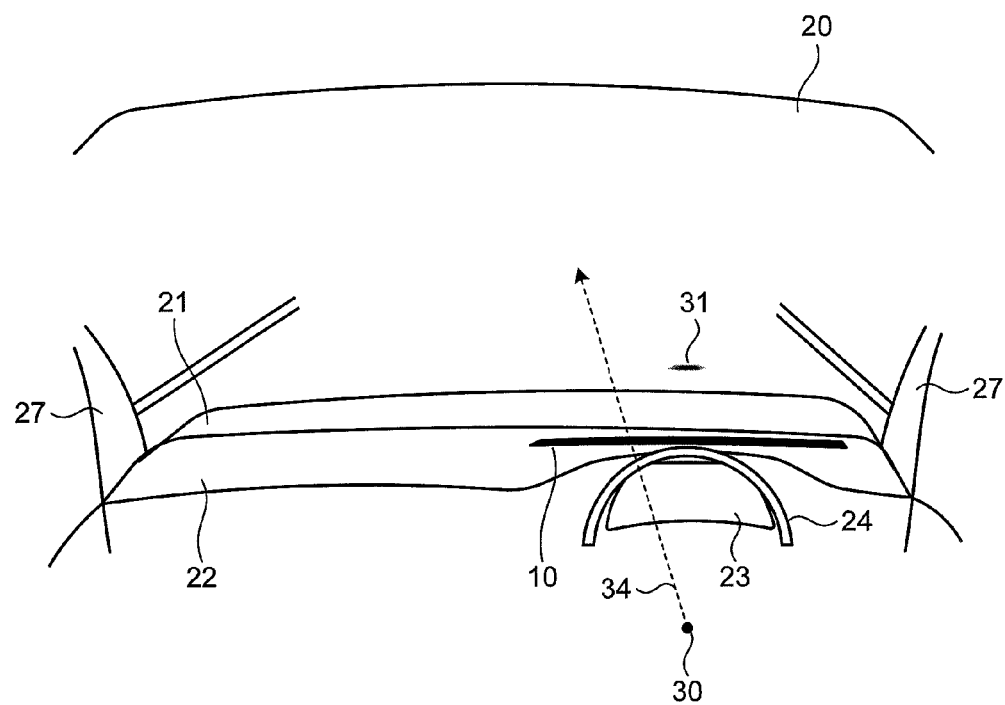
FIG. 25 is a diagram illustrating an example of a normal situation.

Further, according to the risk calculation operation and the lighting control operation of this embodiment, a normal virtual image is projected in the normal situation in which the calling of attention and warning are not needed. FIG. 25 is a diagram illustrating an example of the normal situation. A weak normal virtual image 31 which is different from the notification virtual image 31 and of which the color tone is lowered is projected in the normal (safe) situation illustrated in FIG. 25 (for example, a situation in which the object 2 to be notified is not present around the vehicle 1). The normal virtual image 31 is projected on, for example, a left portion, a center (front) portion, a right portion, or the entire portion when seen from a driver.

Figure 26:
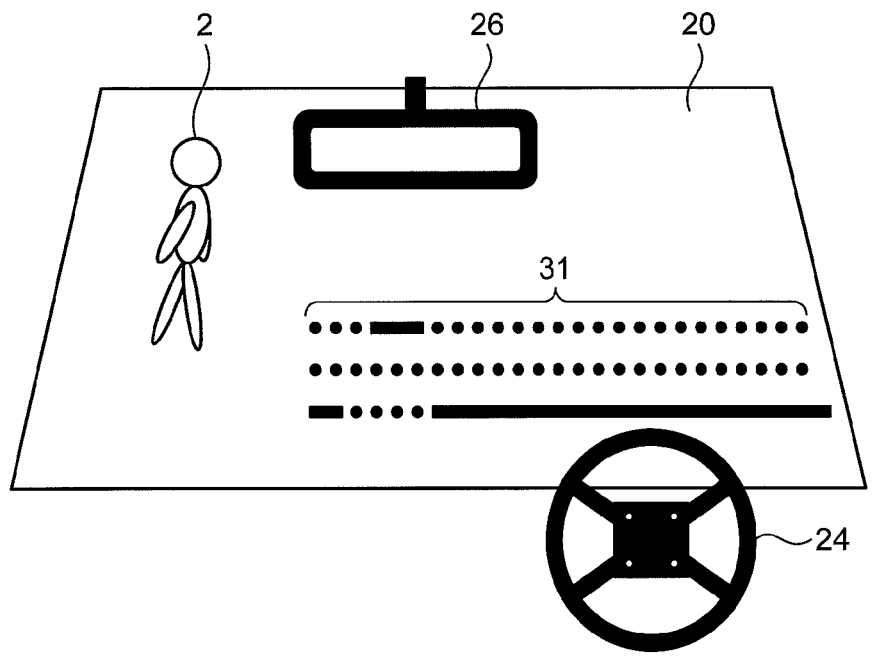
FIG. 26 is a diagram illustrating an example of a scene in which a normal situation has been changed into a situation in which an object to be notified appears and warning is needed.

FIG. 26 is a diagram illustrating an example of a scene in which the normal situation has been changed into a situation in which an object 2 to be notified appears and warning is needed. In the case illustrated in FIG. 26, the lighting control unit 15 weakens the lighting state of a portion, which corresponds to the presence position or the presence direction of the object 2 to be notified, (the left portion of the lowermost layer in FIG. 26) of a green virtual image 31 for normal lighting that is present in the lowermost layer; and enhances the lighting state of a portion, which corresponds to the presence position or the presence direction of the object 2 to be notified, (the left portion of the uppermost layer in FIG. 26) of a red virtual image 31 for warning that is present in the uppermost layer. Accordingly, when the normal situation is changed into a situation in which the calling of attention or warning is needed, it is possible to call the driver's attention or warn a driver more naturally without an uncomfortable feeling and suddenness.

Figure 27:
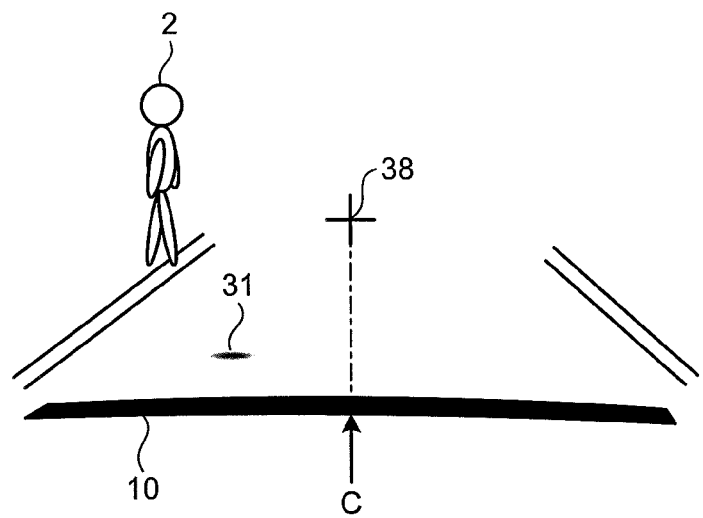
FIG. 27 is a diagram illustrating a virtual image when a vehicle is traveling on a straight road.
Figure 28:
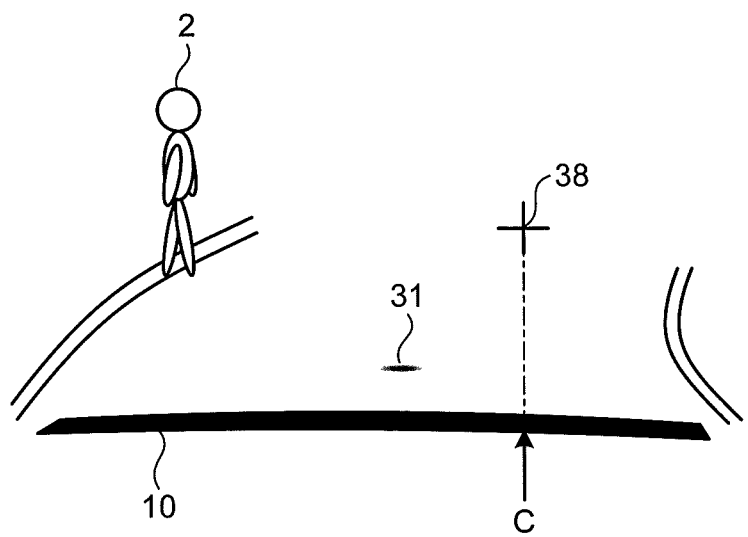
FIG. 28 is a diagram illustrating a virtual image when a vehicle is traveling on a right curved road.

FIG. 27 is a diagram illustrating a virtual image when the vehicle 1 is traveling on a straight road, and FIG. 28 is a diagram illustrating a virtual image when the vehicle 1 is traveling on a right curved road. According to the risk calculation operation and the lighting control operation of this embodiment, while the vehicle 1 travels on a straight road in a situation in which notification is needed, the center position C at the time of lighting is set (adjusted) to the center (front) when seen from the driver as illustrated in FIG. 27. Further, while the vehicle 1 travels on a right curved road in a situation in which notification is needed, the center position C at the time of lighting is set (adjusted) to the right when seen from the driver according to the road shape as illustrated in FIG. 28. Furthermore, a virtual image 31, which is formed on the basis of the setting of each center position C, is projected. Accordingly, it is possible to call the driver's attention or warn a driver by projecting optical stimulus on the range that does not deviate from the visual field of the driver (a constant range from the gazing direction of the driver).

Figure 29:
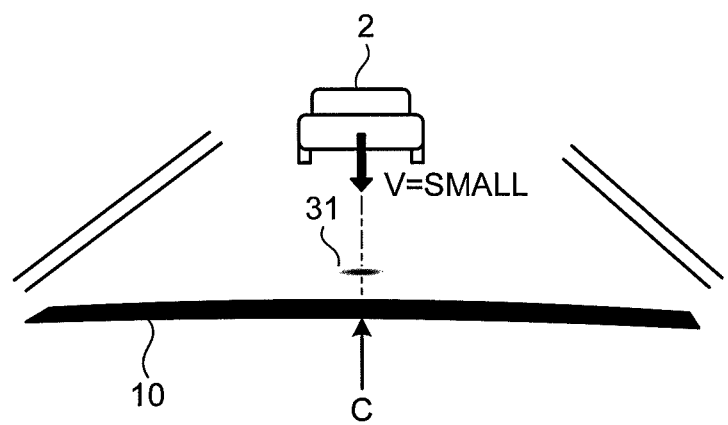
FIG. 29 is a diagram illustrating an example of a situation in which attention to a preceding vehicle needs to be called.
Figure 30:
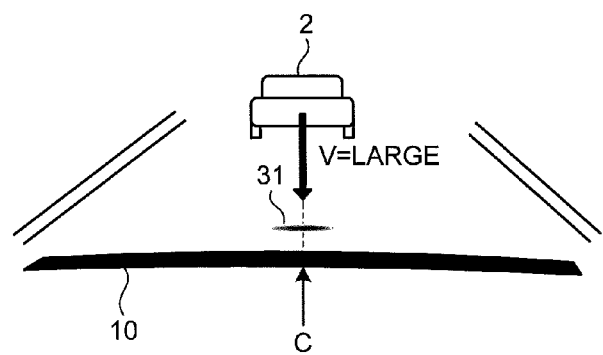
FIG. 30 is a diagram illustrating an example of a situation in which warning about a preceding vehicle is needed.

FIG. 29 is a diagram illustrating an example of a situation in which attention to a preceding vehicle needs to be called, and FIG. 30 is a diagram illustrating an example of a situation in which warning about a preceding vehicle is needed. When a preceding vehicle is detected as an object 2 to be notified, an attention-calling virtual image 31 is projected in a situation in which the relative deceleration V of the object 2 to be notified relative to the vehicle 1 is low as illustrated in FIG. 29 and the calling of attention is needed. The unit variation of the attention-calling virtual image 31 is set as a small value. Meanwhile, a warning virtual image 31 is projected in a situation in which the relative deceleration V of the object 2 to be notified relative to the vehicle 1 is high as illustrated in FIG. 30 and warning is needed. The unit variation of the warning virtual image 31 is set as a large value. Since optical stimulus is presented according to the lighting contents corresponding to the relative relationship between the vehicle 1 and the object 2 to be notified as described above, it is possible to appropriately call the driver's attention or warn the driver.

As described above, according to the vehicle information transmitting apparatus 1-1, it is possible to provide information about the presence of the object 2 to be notified, that is, a human such as a pedestrian or an obstacle to a driver by optical stimulus. However, even though the system provides information about a dangerous object to a driver, there is a case in which the driver drives a vehicle without considering support provided by optical stimulus, such as a case in which the driver does not take an avoidance action.

Here, "a driver considers support information provided by optical stimulus" includes that a driver gazes at an object to be notified corresponding to optical stimulus (virtual image 31) or support information, a driver drives a vehicle on the basis of support information, and a driver performs any operation responding to optical stimulus or the change of the mode of optical stimulus.

Further, "a driver considers support information provided by optical stimulus" includes that an operation performed by a driver after support information is provided is based on the provided support information, the degree of correlation between an operation that is performed by a driver after support information is provided and an operation that is supposed on the basis of the provided support information is high, the track (behavior) of the vehicle 1 that is obtained after support information is provided is based on the provided support information, the degree of correlation between the track (behavior) of the vehicle 1 that is supposed on the basis of provided support information and the actual track (behavior) of the vehicle 1 that is obtained after support information is provided is high, and the like. It can be determined that a driver does not consider support information provided by optical stimulus except for the case of "a driver considers support information provided by optical stimulus". For example, if a driver does not take an avoidance action even though information about an object to be notified is provided by optical stimulus, it can be determined that the driver does not consider the support information provided by optical stimulus.

When support using optical stimulus is not considered, there is a possibility that, for example, the support using optical stimulus is unnecessary and troublesome for a driver. Further, it is not always true that a driver always gazes at the projected virtual image 31. For this reason, even though support using optical stimulus is performed, driver's eyes cannot be guided to the object 2 to be notified. Accordingly, there is a possibility that driver's attention is not called. As a result of the late driver's notice of optical stimulus for notification, there is a possibility that optical stimulus does not have been considered by a driver. As one example, there is a possibility that it is difficult for a driver to notice optical stimulus due to ambient light.

The vehicle information transmitting apparatus 1-1 of this embodiment determines whether or not a driver drives a vehicle in consideration of the support information provided by optical stimulus. When determining that a driver does not drive a vehicle in consideration of the support information, the vehicle information transmitting apparatus 1-1 determines whether or not the method of presenting optical stimulus is a cause as described below. When determining that the method of giving optical stimulus is a cause, the vehicle information transmitting apparatus 1-1 changes the method of giving optical stimulus. For example, the method of giving optical stimulus is changed into a lighting pattern by which the driver feels a higher degree of risk. Accordingly, according to the vehicle information transmitting apparatus 1-1 of this embodiment, it is possible to change the mode of optical stimulus so as to be capable of appropriately transmitting information about the calling of attention or warning to a driver, according to driver's sensitivity, environment around the vehicle 1, or the like.

Returning to FIG. 21, driving data are acquired in Step S5 by the ECU 14. The driving data include information about the driver, an operation input such as a driving operation performed by the driver, and the behavior of the vehicle 1 after information is transmitted by optical stimulus. The information about the driver includes the gazing point or the gazing direction of the driver, the posture of the driver, the voice of the driver, the skill of the driver, continuous driving time, and the like. The driving operation includes, for example, an accelerator operation, a brake operation, a steering operation, a winker operation, a gear shifting operation, an operation input to other operators, and the like. The behavior of the vehicle 1 includes the position information, the longitudinal acceleration, the lateral acceleration, the yaw rate, the vehicle speed, and the like of the vehicle 1. The position information includes the absolute position information of the vehicle 1, the relative position information of the vehicle relative to a white line, a curb, or the like on a road, the relative position information of the vehicle relative to an object 2 to be notified, and the like. Further, the position information includes not only coordinate values but also velocity, acceleration, jerk, and the like. When Step S5 is performed, the control flow proceeds to Step S6.

Figure 31:
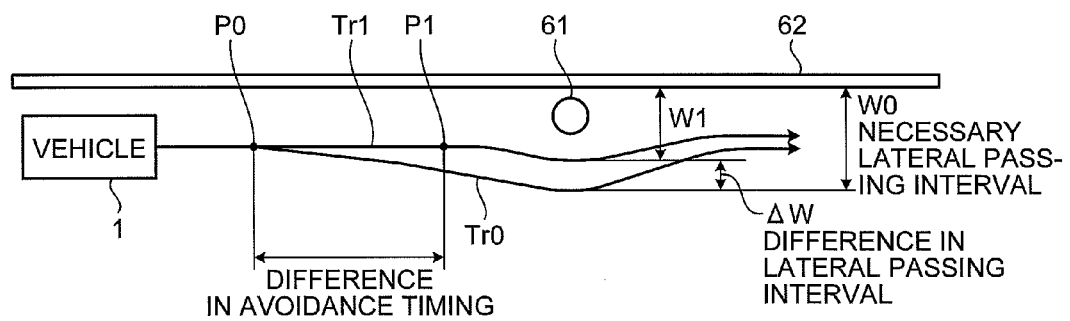
FIG. 31 is a diagram illustrating a method of determining whether or not support information is considered.

In Step S6, the ECU 14 determines whether or not a driver considers the support information. The ECU 14 performs the determination of Step S6 by, for example, a method described with reference to FIG. 31. FIG. 31 is a diagram illustrating a method of determining whether or not the support information is considered. FIG. 31 illustrates a method of performing the determination of Step S6 on the basis of the track of the vehicle 1 when a subject vehicle travels while avoiding a pedestrian 61 who is present on a traveling road of the subject vehicle. In FIG. 31, reference character Tr0 denotes an ideal track that is calculated by the ECU 14 on the basis of the detected pedestrian 61, and reference character Tr1 denotes the actual track of the vehicle 1. In other words, the ideal track Tr0 represents an ideal risk avoidance action that is calculated by the system and the actual track Tr1 represents a risk avoidance action that is actually performed. Here, the track of the vehicle 1 can be a track that is drawn by a representative point such as the centroid of the vehicle 1. Reference numeral 62 denotes a white line that is drawn on the traveling road of the subject vehicle.

When a pedestrian 61 is detected as an object 2 to be notified, the ECU 14 calculates an ideal track Tr0 along which a vehicle travels while avoiding the pedestrian 61. For example, the ideal track Tr0 is a track along which the vehicle 1 can travel with a sufficient interval interposed between the pedestrian 61 and the vehicle in the lateral direction of the vehicle 1. The ideal track Tr0 illustrated in FIG. 31 is a track that allows the traveling direction of the vehicle 1 to change so as to be separated from the pedestrian 61 and the white line 62 at a point P0 before the pedestrian 61 and passes by the pedestrian 61. Meanwhile, methods well known in the related art can be used as a method of detecting the white line 62 and a method of calculating the position of the white line 62. The ECU 14 can acquire the position of the white line 62 by detecting the white line 62 on the basis of image data taken around the vehicle 1 by, for example, a camera mounted on the vehicle 1. Meanwhile, the ECU 14 may be adapted to detect a relative position between the white line 62 and the pedestrian 61 on the basis of the image data.

The ECU 14 determines a necessary passing interval W0 between the vehicle and the white line 62 when the vehicle passes by the pedestrian 61, on the basis of the positional relationship between the pedestrian 61 and the white line 62. In the following description, an interval between the subject vehicle and the white line 62 in the lateral direction, which is obtained when the vehicle passes by the pedestrian 61, is also simply referred to as a "lateral passing interval". The lateral passing interval is, for example, an interval between the representative point of the subject vehicle and the white line 62 in the vehicle width direction. The necessary lateral passing interval W0 is an interval between the white line 62 and the passing track of the vehicle 1 in the vehicle width direction that is necessary for the vehicle to travel while maintaining a sufficient interval between the pedestrian 61 and the vehicle.

Meanwhile, when the pedestrian 61 is moving, the ideal track Tr0 is determined on the basis of the moving direction and the moving velocity of the pedestrian 61. The ideal track Tr0 may be determined so as to make the behavior stability of the vehicle 1 be compatible with the avoidance of the pedestrian 61.

The ECU 14 can calculate the actual traveling track Tr1 of the vehicle 1 on the basis of the driving data that are acquired in Step S5. The actual traveling track Tr1 may be based on the position information of the subject vehicle that is acquired from, for example, a navigation system, and may be based on image data that are taken by an imaging device such as a camera. The traveling direction of the vehicle 1 is changed and an avoidance action is started at a point P1, which is closer to the pedestrian 61 than the point P0 in the traveling direction, on the actual track Tr1. In other words, a timing at which the driver starts an avoidance action (hereinafter, also simply referred to as an "avoidance timing") is later than an avoidance timing that is obtained when the vehicle travels along the ideal track Tr0. Further, a lateral passing interval W1 of the actual track Tr1 is smaller than the lateral passing interval W0 of the ideal track Tr0.

The ECU 14 can perform the determination of Step S6 on the basis of a difference between an ideal avoidance timing and an actual avoidance timing or a difference between an ideal lateral passing interval W0 and an actual lateral passing interval W1. When a difference between an ideal avoidance timing and an actual avoidance timing or a difference between an ideal lateral passing interval and an actual lateral passing interval is large, it is possible to estimate that any one of the operation input and the behavior of the vehicle 1 is not based on the transmitted support information. For example, when the actual avoidance timing is later than the ideal avoidance timing and a difference in the avoidance timing exceeds a threshold or when the actual lateral passing interval W1 is smaller than the ideal lateral passing interval W0 and a difference ΔW in the lateral passing interval exceeds a threshold, negative determination is made in Step S6. Meanwhile, a method of determining whether or not the driver considers the support information is not limited to this. That is, the degree of correlation between the ideal track Tr0 and the actual track Tr1 is calculated, and negative determination may be made in Step S6 when the degree of correlation is low.

Meanwhile, a method of determining whether or not the driver considers the support information is not limited to this. It may be possible to determine whether or not the driver considers the support information, on the basis of any one of the acquired information about the driver, a scanning input, and the behavior of the vehicle 1. For example, the ECU 14 may be adapted to determine whether or not the driver considers the support information on the basis of the information about the driver. For example, when the driver does not gaze at the object 2 to be notified or gazes at the object 2 to be notified for a short time after attention is called or information about warning is transmitted by optical stimulus, it may be determined that the driver does not consider the support information. Further, when an operation for avoiding risk is not input after information is transmitted, it may be determined that the driver does not consider the support information. In other words, if an operation input after the transmission of information is not based on the transmitted information, it may be determined that the driver does not consider the support information.

If it is determined that the driver considers the support information as a result of the determination of Step S6 (Yes in Step S6), this control flow is ended. If not (No in Step S6), the control flow proceeds to Step S7.

In Step S7, the ECU 14 determines whether or not a method of giving support information is a cause. The ECU 14 determines whether or not a cause that the driver does not consider the support information resides in a method of giving optical stimulus, that is, the mode of light projected on the front window glass 20. The determination method of Step S7 does not matter as long as it is possible to determine whether or not a cause that the driver does not drive a vehicle in consideration of support information is a method of presenting information by optical stimulus. For example, if the actual avoidance timing is later than the ideal avoidance timing, it is possible to estimate that an operation input or the behavior of the vehicle 1 is not based on the transmitted support information. In this case, it is thought that it takes time for the driver to notice the calling of attention or warning provided by optical stimulus. The ECU 14 may be adapted to determine that a method of giving support information is a cause when the actual avoidance timing is later than the ideal avoidance timing to a certain extent or more.

Further, when the actual lateral passing interval W1 is smaller than the ideal lateral passing interval W0, it is possible to estimate that an operation input or the behavior of the vehicle 1 is not based on the transmitted support information. In this case, there is a possibility that the calling of attention or warning provided by optical stimulus is not sufficiently noticed by the driver. The ECU 14 may be adapted to determine that a method of giving support information is a cause when the actual lateral passing interval W1 is smaller than the ideal lateral passing interval W0 to a certain extent or more.

Furthermore, when positive determination is made in this step as described below, processing for correcting optical stimulus is performed in Step S8. When the determination result or a determining parameter of whether or not the driver considers the support information in Step S6 is not changed before and after this processing for correcting optical stimulus, it may be determined that a method of giving support information is a cause. For example, when the determination result of Step S6 is negative and not changed before and after the processing for correcting optical stimulus, it is possible to determine that a method of giving support information is a cause. Moreover, examples of the determining parameter include a difference between the ideal avoidance timing and the actual avoidance timing, and a difference ΔW in the lateral passing interval between the ideal lateral passing interval W0 and the actual lateral passing interval W1. The ECU 14 may be adapted to determine that a method of giving support information is a cause when the change of the determining parameter does not occur or is small before and after the processing for correcting optical stimulus. Further, the ECU 14 can determine that a method of giving support information is not a cause when it is not determined that the driver considers the support information in Step S6 even though a virtual image 31 is projected according to a lighting pattern of which the degree of warning is highest.

Furthermore, it may be determined whether or not a method of giving support information is a cause on the basis of information about a driver or an operation input. For example, when the driver does not gaze at the object 2 to be notified or gazes at the object 2 to be notified for a short time after attention is called or information about warning is transmitted by optical stimulus, it may be determined that a method of giving support information is a cause. Alternatively, when it is determined that the driver's attention is reduced on the basis of the information about the driver, it may be determined that a method of giving support information is a cause.

If it is determined that a method of giving support information is a cause (Yes in Step S7) as a result of the determination of Step S7, the control flow proceeds to Step S8. If not (No in Step S7), the control flow proceeds to Step S9.

The processing for correcting optical stimulus is performed in Step S8 by the ECU 14. The ECU 14 changes the value of at least one of the color, the size, the shape, the flickering cycle, and the brightness of the light of the virtual image 31, the gradient of the change thereof, the lighting timing, and the like. For example, if it is determined in Step S7 that the driver cannot react due to the late notice of the lighting of an attention-calling or a warning lighting pattern, processing for correcting optical stimulus is performed so that the driver can quickly notice the lighting for the calling of attention or warning. In this case, for example, if the light sources 10a have been lit (a normal lighting pattern is switched to an attention-calling lighting pattern or a warning lighting pattern) at a time TTC of 3 [sec] at which collision with the object 2 to be notified is predicted to occur until that time, correction is performed so as to light the light sources 10a (to switch a lighting pattern) at a time TTC of 4 [sec]. Further, the value of at least one of the color, the flickering frequency, the area, and brightness of the light of the light source 10a or the gradient of the change thereof may be changed so that a driver easily notices the virtual image 31. The color, the brightness, and the like of the virtual image 31 are changed into a color, brightness, and the like, which correspond to a higher degree of risk, by the processing for correcting optical stimulus. When the processing for correcting optical stimulus is performed, the control flow proceeds to Step S3 and corrected optical stimulus is determined.

The continuation of support is confirmed in Step S9 by the ECU 14. The ECU 14 confirms whether or not a driver needs the continuation of support provided by optical stimulus. The ECU 14 urges the driver to express an intention of whether or not the continuation of support is needed. Examples of a method of inquiring about a driver's intention of continuing support include a method of inquiring about whether or not the continuation of support is needed by a voice, a method of displaying an inquiry of whether or not the continuation of support is needed on the screen of a navigation system, a method of lighting (flickering) the lighting pattern of the virtual image 31 according to a pattern for confirming whether or not the continuation of support is needed, and a method of presenting vibration or a reaction force for representing the confirmation of the continuation of support from a steering wheel or an accelerator.

Any one of a method of expressing a driver's desire when a driver desires the continuation of support and a method of expressing a driver's desire when a driver does not desire the continuation of support may be used as a method of expressing whether or not the continuation of support is needed to the system by a driver. Further, a method of expressing a driver's intention may be a method of actively expressing a driver's intention by an operation input, a voice, or the like or a method of passively expressing a driver's intention by not using an operation input, a voice, or the like.

Examples of a method of expressing of an intention desiring the continuation of support include a method of continuing to drive a vehicle as it is, a method of operating a support continuation switch, and a method of expressing an intention of continuing support by a voice. If a driver continues to drive a vehicle as it is for a predetermined time after the inquiry of whether or not the continuation of support is needed, it is determined that an intention of desiring the continuation of support is expressed. Accordingly, a driver, which desires the continuation of support, can express an intention of desiring the continuation of support without a specific operation. The support continuation switch is a switch that can express an intention of desiring the continuation of support by an operation input such as pressing.

Examples of a method of expressing an intention not desiring the continuation of support include a method of continuing to drive a vehicle as it is, a method of operating a support stop switch, and a method of expressing an intention of stopping support by a voice. If a driver continues to drive a vehicle as it is for a predetermined time after the inquiry of whether or not the continuation of support is needed, it is determined that an intention of not desiring the continuation of support is expressed. Accordingly, a driver, which does not desire the continuation of support, can express an intention of not desiring the continuation of support without a specific operation. The support stop switch is a switch that can express an intention of not desiring the continuation of support by an operation input such as pressing.

If it is determined that a driver desires the continuation of support (Yes in Step S9) as a result of the determination of Step S9, this control flow is ended. If not (No in Step S9), the control flow proceeds to Step S10.

The support provided by optical stimulus is stopped in Step S10 by the ECU 14. When Step S10 is performed, this control flow is ended.

As described above, according to the vehicle information transmitting apparatus 1-1 of this embodiment, it is determined whether or not a driver considers support information provided by optical stimulus, and it is further determined whether or not a cause that the support information is not considered resides in a method of giving the support information when it is determined that the driver does not consider the support information. If it is determined that a method of giving support information is a cause, it is determined that the mode of optical stimulus is to be changed. For example, at least one of the form of optical stimulus, the lighting of optical stimulus, and a switching timing is changed, so that the mode of the optical stimulus is changed. Accordingly, it is possible to realize appropriate optical stimulus that can guide driver's eyes to the object 2 to be notified. That is, according to the vehicle information transmitting apparatus 1-1 of this embodiment, it is possible to change support method to the method capable of guiding drivers operation according to the driver's sense when a support effect does not appear.

Further, the vehicle information transmitting apparatus 1-1 of this embodiment confirms a driver's intention of continuing support when it is not determined that a cause that support information is not considered resides in a method of giving support information. The vehicle information transmitting apparatus 1-1 ends the driving support provided by optical stimulus when the expression of an intention that the continuation of support is unnecessary is detected. Accordingly, it is possible to remove troublesomeness that is caused by the support unnecessary for a driver.

First Modification of Embodiment

Figure 32:
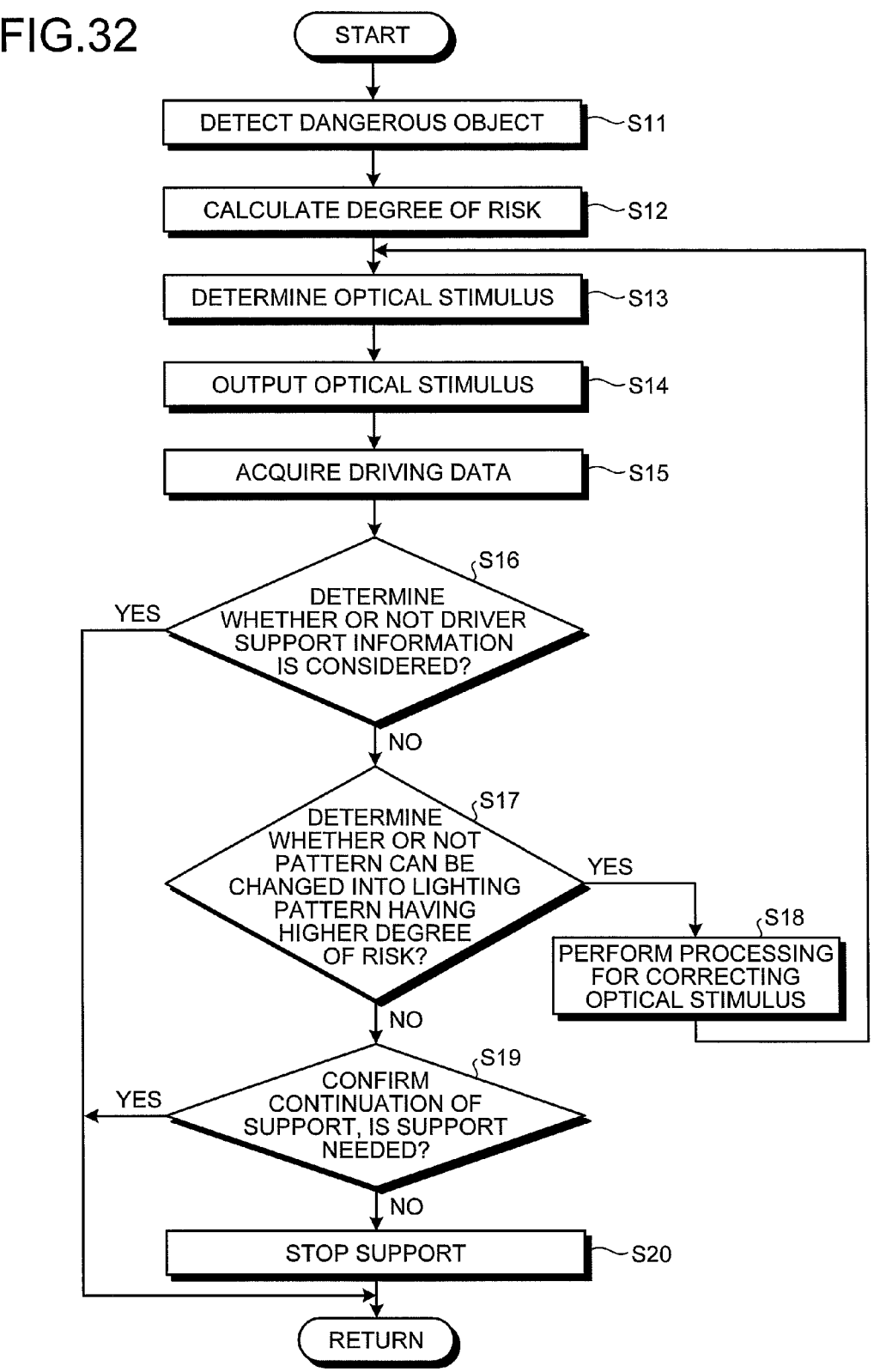
FIG. 32 is a flowchart according to a first modification of the embodiment.

A first modification of the embodiment will be described. This modification is different from the embodiment in that it is determined whether or not a cause that a driver does not consider information resides in a method of presenting optical stimulus by the change of a method of presenting optical stimulus. FIG. 32 is a flowchart according to this modification.

In FIG. 32, Steps S11 to S16 can be similar to Steps S1 to S6 of FIG. 21, respectively. That is, when the ECU 14 detects dangerous objects in Step S11, calculates the degree of risk in Step S12, determines optical stimulus in Step S13, outputs the optical stimulus in Step S14, and acquires driving data in Step S15, the ECU 14 determines whether or not a driver considers support information in Step S16.

When negative determination is made in Step S16 and a control flow proceeds to Step S17, the ECU 14 determines whether or not a pattern can be changed into a lighting pattern having a higher degree of risk in Step S17. The ECU 14 can change a lighting pattern as means for changing a method of presenting optical stimulus. The lighting pattern includes lighting contents or lighting modes about the irradiation position of light projected on the front window glass 20, the irradiation area of light, the color of light, the brightness of light, the cycle (flickering) of light, the variation of the color of light or the brightness of light per unit change (the unit variation of a color or brightness), and the like.

For example, the ECU 14 can present optical stimulus according to an arbitrary lighting pattern that is selected from a plurality of lighting patterns having different degrees of risk between a lighting pattern from which the degree of risk is felt high and a lighting pattern from which the degree of risk is not felt high. As one example, a plurality of lighting patterns which have different degrees of risk and of which colors of light or the like are different from each other can be set as attention-calling lighting patterns, or a plurality of lighting patterns which have different degrees of risk and of which colors of light or the like are different from each other can be set as warning lighting patterns.

The ECU 14 determines whether or not a lighting pattern can be changed into a lighting pattern from which the degree of risk is felt higher than a currently selected lighting pattern. Here, the currently selected lighting pattern is the lighting pattern that has been subjected to the determination of whether or not a driver considers the support information provided by the optical stimulus of the lighting pattern in Step S16.

If it is determined that a lighting pattern can be changed into a lighting pattern of which the degree of risk is higher (Yes in Step S17) as a result of the determination of Step S17, the control flow proceeds to Step S18. If not (No in Step S17), the control flow proceeds to Step S19. That is, if a lighting pattern can be changed into a lighting pattern of which the degree of risk is higher in Step S17, it is estimated that a cause that a driver does not drive a vehicle in consideration of support information resides in a method of giving support information. Meanwhile, if there is no room for the change of a lighting pattern into a lighting pattern of which the degree of risk is higher, it is estimated that a cause that a driver does not drive a vehicle in consideration of support information does not reside in a method of giving support information.

The processing for correcting optical stimulus is performed in Step S18 by the ECU 14. The ECU 14 changes a lighting pattern of optical stimulus into a lighting pattern from which the degree of risk is felt higher. For example, the ECU 14 can change a lighting pattern into a lighting pattern from which the degree of risk is felt higher, by changing the unit variation of the color or brightness of light into a large value. When Step S18 is performed, the control flow proceeds to Step S13.

When negative determination is made in Step S17 and the control flow proceeds to Step S19, the continuation of support is confirmed in Step S19 by the ECU 14. When negative determination is made in Step S17, the lighting pattern of optical stimulus already has become a lighting pattern from which the degree of risk is felt highest. If a driver does not drive a vehicle in consideration of support information provided by optical stimulus in this state, it is thought that a driver does not reflect the support information on the driving even though noticing that the support information provided by optical stimulus is provided. That is, it can be determined that a cause that a driver does not consider optical stimulus is not present on a method of giving support information provided by optical stimulus. The ECU 14 confirms whether or not a driver needs the continuation of support provided by optical stimulus. The ECU 14 may confirm a driver's intention by, for example, a method similar to Step S9 illustrated in FIG. 21. If it is determined that a driver desires the continuation of support (Yes in Step S19) as a result of the determination of Step S19, this control flow is ended. If not (No in Step S19), the control flow proceeds to Step S20.

The support provided by optical stimulus is stopped in Step S20 by the ECU 14. When Step S20 is performed, this control flow is ended.

According to this modification, the lighting pattern of optical stimulus is changed when the support information is not considered by a driver. Accordingly, it is possible to determine whether or not a cause that support information is not considered resides in a method of giving optical stimulus, and it is possible to appropriately call driver's attention by changing a lighting pattern of optical stimulus into an appropriate lighting pattern when optical stimulus cannot sufficiently call driver's attention.

Second Modification of Embodiment

Figure 33:
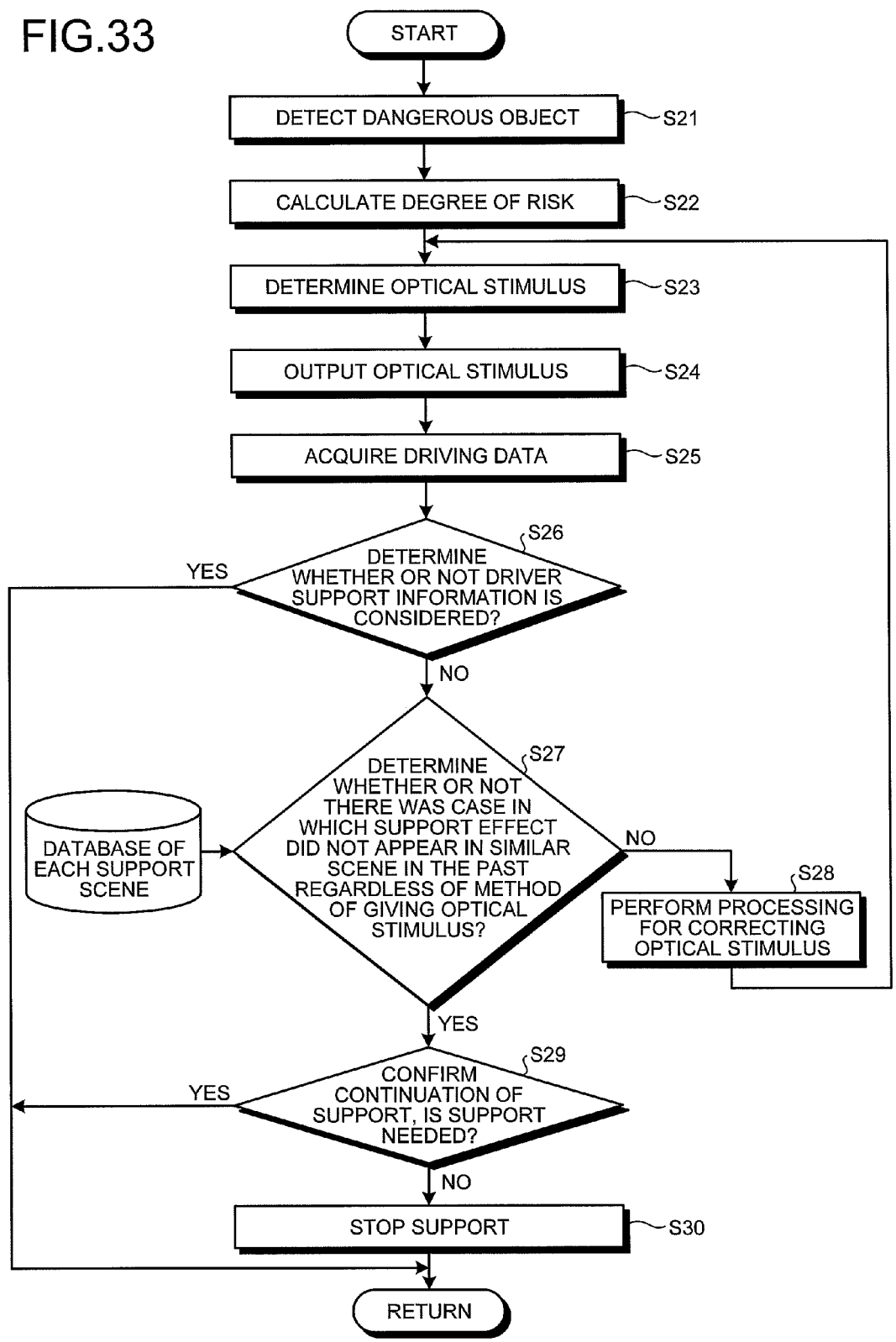
FIG. 33 is a flowchart according to a second modification of the embodiment.

A second modification of the embodiment will be described. This modification is different from the embodiment in that it is determined whether or not a cause that support information is not considered resides in a method of giving optical stimulus on the basis of whether or not there was a case in which a support effect did not appear in a similar scene in the past regardless of a lighting pattern of optical stimulus. FIG. 33 is a flowchart according to this modification.

A control flow illustrated in FIG. 33 is performed, for example, during the traveling of a vehicle 1. Steps S21 to S26 can be similar to Steps S1 to S6 of FIG. 21, respectively. That is, when the ECU 14 detects dangerous objects in Step S21, calculates the degree of risk in Step S22, determines optical stimulus in Step S23, outputs the optical stimulus in Step S24, and acquires driving data in Step S25, the ECU 14 determines whether or not a driver considers support information in Step S26.

When negative determination is made in Step S26 and the control flow proceeds to Step S27, the ECU 14 determines whether or not there was a case in which a support effect did not appear in a similar scene in the past regardless of a method of giving optical stimulus, in Step S27. The ECU 14 is connected to a database of each support scene. The database is stored in, for example, a storage unit of the ECU 14. A determination result of whether or not support information provided by optical stimulus in each scene is considered by a driver is stored in the database.

The scene includes, for example, information about objects 2 to be notified, such as the types of detected objects 2 to be notified, the number of objects 2 to be notified, the positions of objects 2 to be notified, and a positional relationship between the objects 2 to be notified and the vehicle 1. Further, the scene includes information about a vehicle state, such as vehicle speed, acceleration, and a steering state. Furthermore, the scene includes information about situations (curve, a gradient, and the like) of a traveling road or traveling environments, such as a preceding vehicle, an oncoming vehicle, weather, night, a visual field, and ambient light.

The ECU 14 stores whether or not it is determined that support information provided by optical stimulus is considered by a driver, which lighting pattern allows a driver to consider support information by optical stimulus, whether or not support information is considered by a driver regardless of a method of giving optical stimulus, and the like, for each scene in the database. For example, whenever performing the determination of Step S26, the ECU 14 stores a determination result in the database in association with the scene and the lighting pattern. Since a new determination result is stored in the database whenever determination is performed, information about the past determination result is accumulated in the database at any time.

When negative determination is made in Step S26, the ECU 14 stores a fact that the negative determination is made, a scene, and the lighting pattern of optical stimulus at that time, that is, information about a method of giving optical stimulus or the mode of the optical stimulus in the database in association with each other. Further, when positive determination is made in Step S26, the ECU 14 stores a fact that the positive determination is made, a scene, and the lighting pattern of optical stimulus at that time in the database in association with each other. That is, the ECU 14 stores a correspondence between the mode of optical stimulus and the determination of whether or not information transmitted by the stimulus of this mode is considered by a driver.

The ECU 14 determines whether or not there is a case in which support information provided by optical stimulus for each scene is not considered by a driver, which lighting pattern allows a driver to consider support information by optical stimulus, and whether or not there is a case in which support information is not considered by a driver regardless of a method of giving optical stimulus, on the basis of information that is accumulated in the database.

For example, if a record that negative determination is made in Step S26 is not present in the database in the same scene as the current scene or a scene similar to the current scene, it can be determined that there is no case in which support information provided by optical stimulus is not considered by a driver in the scene. Meanwhile, if a record that negative determination is made in Step S26 is present in the database in the same scene as the current scene or a scene similar to the current scene, it can be determined that there is a case in which support information provided by optical stimulus is not considered by a driver in the scene.

Further, the ECU 14 can acquire (1) a lighting pattern in which support information provided by optical stimulus is not considered by a driver, (2) a lighting pattern in which support information provided by optical stimulus may not be considered by a driver, and (3) a lighting pattern in which support information provided by optical stimulus is considered by a driver, on the basis of the database, in a predetermined scene.

(1) The lighting pattern in which support information provided by optical stimulus is not considered by a driver can be a lighting pattern in which only a record that negative determination is made in Step S26 is present in, for example, the record about a predetermined scene of the database.

(2) The lighting pattern in which support information provided by optical stimulus may not be considered by a driver can be a lighting pattern in which both a record that negative determination is made in Step S26 and a record that positive determination is made in Step S26 are present in, for example, the record about a predetermined scene of the database.

(3) The lighting pattern in which support information provided by optical stimulus is considered by a driver can be a lighting pattern in which only a record that positive determination is made in Step S26 is present in, for example, the record about a predetermined scene of the database.

The ECU 14 can determine whether or not there is a case in which support information is not considered by a driver regardless of a method of giving optical stimulus on the basis of information recorded in the database, in the same scene as the current scene or a scene similar to the current scene.

For example, if a lighting pattern from which the degree of risk is felt highest is (1) the lighting pattern in which support information provided by optical stimulus is not considered by a driver in the same scene as the current scene or a scene similar to the current scene, it can be determined that there is a case in which support information is not considered by a driver in the scene regardless of a method of giving optical stimulus in the scene. Alternatively, if each of all of the recorded lighting patterns is the lighting pattern of (1) in the same scene as the current scene or a scene similar to the current scene, it may be determined that there is a case in which support information is not considered by a driver in the scene regardless of a method of giving optical stimulus in the scene. That is, the ECU 14 can determine whether or not a cause that support information is not considered by a driver resides in the mode of stimulus, on the basis of information stored in the database.

If it is determined that there is a case in which a support effect did not appear in a similar scene in the past regardless of a method of giving optical stimulus (Yes in Step S27) as a result of the determination of Step S27, the control flow proceeds to Step S29. If not (No in Step S27), the control flow proceeds to Step S28.

The processing for correcting optical stimulus is performed in Step S28 by the ECU 14. The ECU 14 changes a lighting pattern of optical stimulus into a lighting pattern, which is easily considered by a driver, on the basis of, for example, information recorded in the database. If the current lighting pattern is classified into (1) the lighting pattern in which support information provided by optical stimulus is not considered by a driver according to the database, the ECU 14 changes the lighting pattern into the lighting pattern of (2) or the lighting pattern of (3). Further, if the current lighting pattern is classified into the lighting pattern of (2) according to the database, the ECU 14 changes the lighting pattern into the lighting pattern of (3). Meanwhile, a method of the processing for correcting optical stimulus is not limited to this. For example, the lighting pattern may be changed into a lighting pattern of which the degree of risk is higher as in the embodiment. When Step S28 is performed, the control flow proceeds to Step S23 and optical stimulus is determined.

The continuation of support is confirmed in Step S29 by the ECU 14. The ECU 14 can confirm a driver's intention in the same way as, for example, Step S9 of the embodiment (FIG. 21). If it is determined that a driver desires the continuation of support (Yes in Step S29) as a result of the determination of Step S29, this control flow is ended. If not (No in Step S29), the control flow proceeds to Step S30.

The support provided by optical stimulus is stopped in Step S30 by the ECU 14. When Step S30 is performed, this control flow is ended.

According to this modification, it is determined whether or not a cause that support information is not considered resides in a method of giving optical stimulus on the basis of the past determination result of whether or not a vehicle is driven in consideration of support information. Accordingly, it is possible to accurately determine whether or not a cause that support information is not considered resides in a method of giving optical stimulus. Further, it is possible to appropriately determine correction contents, which are obtained when processing for correcting optical stimulus is performed so that support information provided by optical stimulus is considered, on the basis of the past determination result.

Furthermore, in this modification, it is possible to determine which element causes support information not to be considered when there are a plurality of elements forming a method of presenting optical stimulus. The elements, which form a method of presenting optical stimulus, may include the color, the size (area), the shape, the flickering cycle, and the brightness of light, the gradient of the change of the color or brightness of light, and the lighting timing.

For example, it is possible to determine whether or not a cause that support information is not considered is a fact that a driver cannot react due to the late driver's notice of the change of a lighting pattern. The ECU 14 can acquire a correlation between the change timing of a lighting pattern and whether or not support information is considered in a scene similar to the current scene, on the basis of a database. It is possible to determine whether or not the change timing of a lighting pattern later than a distance between an object 2 to be notified and a vehicle or TTC is a cause that support information is not considered, on the basis of this correlation. For example, if there is a record that support information was not considered in the past when support information was provided by optical stimulus at the same timing as the change timing of the current lighting pattern in a scene similar to the current scene and there is no record that support information was not considered in the past when support information was provided at a timing earlier than the change timing of the current lighting pattern, it is possible to estimate that the change timing of a lighting pattern is one of causes that support information is not considered.

When it is determined that a cause that support information is not considered resides in the change timing of a lighting pattern, correction processing for making the change timing of a lighting pattern of optical stimulus early may be performed in Step S28. For example, if the change timing of optical stimulus until that time is a time TTC of 3 [sec], processing for correcting optical stimulus may be performed to change the change timing of optical stimulus to a time TTC of 4 [sec]. Since the change timing of a lighting pattern is made early, time between the driver's notice of the calling of attention or warning provided by the change of a lighting pattern and the determination of a countermeasure against an object 2 to be notified such as a pedestrian is lengthened. Accordingly, a driver can react to support information provided by optical stimulus and perform a driving operation in consideration of support information. Therefore, an effect of support information provided by optical stimulus is enhanced, so that it is possible to realize the improvement of drivability.

Further, the ECU 14 can determine whether or not a cause that support information is not considered resides in a fact that a risk feeling is not transmitted to a driver and the driver cannot be subjected to an operation guide. In the elements that form a method of presenting optical stimulus, elements relating to the risk feeling are a lighting color, a size, a shape, a flickering cycle, the gradient of the change of the color or brightness of light, and the like. For example, if there is a record that support information was not considered in the past when support information was provided by optical stimulus having the current flickering cycle and there is no record that support information was not considered in the past when support information was provided by optical stimulus having a flickering cycle smaller than the current flickering cycle, it is possible to estimate that a flickering cycle is one of causes that support information is not considered.

When it is determined that a cause that support information is not considered resides in a flickering cycle, correction processing for making the flickering cycle of optical stimulus small may be performed in Step S28.

Likewise, when it is determined that a cause that support information is not considered resides in the lighting color of optical stimulus, correction processing for changing a lighting color into a color from which risk is felt higher may be performed in Step S28. When it is determined that the shape of light is a cause, correction processing for changing the shape of a virtual image 31 into a shape from which risk is felt higher may be performed in Step S28. Further, when it is determined that the area of light is a cause, correction processing for increasing the area of a virtual image 31 may be performed in Step S28. When it is determined that the gradient of the change of the color or brightness of light is a cause, correction processing for increasing the gradient of the change of brightness may be performed in Step S28.

The contents disclosed in the embodiment and the modification can be appropriately combined with each other when being embodied.

REFERENCE SIGNS LIST 1-1 VEHICLE INFORMATION TRANSMITTING APPARATUS
1 VEHICLE
2 OBJECT TO BE NOTIFIED
10a LIGHT SOURCE
14 ECU
20 FRONT WINDOW GLASS
30 EYE POINT
31 VIRTUAL IMAGE
38 GAZING POINT
61 PEDESTRIAN
Tr0 IDEAL TRACK
Tr1 ACTUAL TRACK

The invention claimed is:

1. A vehicle information transmitting apparatus, comprising:
   a controller that transmits information to a driver by optical stimulus, the information relating to a dangerous object around a subject vehicle, wherein:
   when it is determined that the information is not considered by the driver on the basis of at least one of information about the driver, an operation input, and a behavior of a vehicle, the information about the driver, the operation input, and the behavior being obtained after the transmission of the information, the controller determines whether or not a cause that the information is not considered by the driver resides in a mode of the stimulus based on at least one of a current mode of the stimulus, a start timing at which an avoidance action of avoiding the dangerous object and a track of the subject vehicle in the avoidance action, and
   the controller confirms whether or not the information continues to be transmitted to the driver by the stimulus when it is not determined that the cause that the information is not considered by the driver resides in the mode of the stimulus.

2. The vehicle information transmitting apparatus according to claim 1,
   wherein it is determined that the information is not considered by the driver on the basis of the degree of correlation between the behavior of the vehicle that is supposed on the basis of the information transmitted to the driver and an actual behavior of the vehicle that is obtained after the transmission of the information.

3. The vehicle information transmitting apparatus according to claim 1,
wherein the mode of the stimulus is changed when it is determined that a cause that the information is not considered by the driver resides in the mode of the stimulus.

4. The vehicle information transmitting apparatus according to claim 1,
wherein it is determined that the information is not considered by the driver when at least one of the operation input and the behavior of the vehicle obtained after the transmission of the information is not based on the information transmitted to the driver.

5. The vehicle information transmitting apparatus according to claim 3,
wherein a correspondence between the mode of the stimulus and the determination of whether or not information transmitted by the stimulus of the mode is considered by the driver is stored, and it is determined whether or not a cause that the information is not considered by the driver resides in the mode of the stimulus on the basis of the stored correspondence.

6. The vehicle information transmitting apparatus according to claim 1,
wherein the mode of the stimulus includes at least one of the brightness of light, the color of light, the size of light to be projected, the shape of light to be projected, the blinking cycle of light, the gradient of the change of the brightness of light, and the timing of the stimulus.

7. The vehicle information transmitting apparatus according to claim 1,
wherein a correspondence between the mode of the stimulus and the determination of whether or not information transmitted by the stimulus of the mode is considered by the driver is stored, and it is determined whether or not a cause that the information is not considered by the driver resides in the mode of the stimulus on the basis of the stored correspondence.

8. The vehicle information transmitting apparatus according to claim 1, wherein the controller determines that the cause that the information is not considered by the driver resides in the mode of the stimulus when the mode of the stimulus can be changed to a mode of stimulus by which the driver feels a higher degree of risk than the current mode of the stimulus.

9. The vehicle information transmitting apparatus according to claim 1, wherein the controller calculates an ideal start timing of the avoidance action and determines that the cause that the information is not considered by the driver resides in the mode of the stimulus when an actual start timing of the avoidance action is later than the ideal start timing for a predetermined time or longer.

* * * * *